(12) United States Patent
Collins et al.

(10) Patent No.: US 12,107,702 B2
(45) Date of Patent: Oct. 1, 2024

(54) ELECTRICAL LOAD VALIDATION FOR A SMART SPACE IN A BUILDING

(71) Applicant: Innovative Building Technologies, LLC, Seattle, WA (US)

(72) Inventors: Arlan E. Collins, Seattle, WA (US); Mark L. Woerman, Seattle, WA (US); Eric Peter Hinckley, Superior, CO (US); Stephen David Corcoran, Esquimalt (CA); Francis Leo Bushell, III, Los Angeles, CA (US); Bernard Robert Franza, Jr., Seattle, WA (US); Shawn Kahlil Cullingford, Winter Park, CO (US); Jonathon Michael Best, Denver, CO (US); Brett Andrew Barrett, Wheat Ridge, CO (US)

(73) Assignee: Innovative Building Technologies, LLC, Seattle, WA (US)

( * ) Notice: Subject to any disclaimer, the term of this patent is extended or adjusted under 35 U.S.C. 154(b) by 0 days.

(21) Appl. No.: 18/248,585

(22) PCT Filed: Oct. 13, 2021

(86) PCT No.: PCT/US2021/054778
§ 371 (c)(1),
(2) Date: Apr. 11, 2023

(87) PCT Pub. No.: WO2022/081704
PCT Pub. Date: Apr. 21, 2022

(65) Prior Publication Data
US 2023/0388146 A1 Nov. 30, 2023

Related U.S. Application Data
(60) Provisional application No. 63/091,043, filed on Oct. 13, 2020.

(51) Int. Cl.
*H04L 12/28* (2006.01)
*F24D 3/18* (2006.01)
(Continued)

(52) U.S. Cl.
CPC ............ *H04L 12/2821* (2013.01); *F24D 3/18* (2013.01); *F24D 19/1009* (2013.01);
(Continued)

(58) Field of Classification Search
CPC ...... G05B 19/054; G05B 15/02; H04L 41/044
See application file for complete search history.

(56) References Cited

U.S. PATENT DOCUMENTS 9,366,451 B2 6/2016 Guo et al.
2014/0379156 A1 12/2014 Kamel et al.
(Continued)

OTHER PUBLICATIONS

USPTO, Written Opinion for International Patent Application No. PCT/US2021/054778, Jan. 28, 2022, 5 pages.
(Continued)

*Primary Examiner* — Barbara B Anyan
(74) *Attorney, Agent, or Firm* — IP Spring

(57) ABSTRACT

A method/system monitors and controls operational aspects of devices in a space, for example a living, office or other human-occupied space or storage space, in a building, such as turning lights on/off, raising/lowering blinds, maintaining or changing temperature, and other operational aspects. Sensors monitor energy usage of the devices in the space, and a controller/engine compares the monitored energy usage with reference energy usage to validate whether the devices are performing as expected. A temperate set-versus-anomaly detection technique may use temperature set point adjustments by a user (during a timeframe) to determine whether an anomaly exists that requires changes in the central plant of the building.

20 Claims, 11 Drawing Sheets

(51) Int. Cl.
  *F24D 19/10*   (2006.01)
  *F24F 11/83*   (2018.01)
  *G05B 15/02*   (2006.01)
  *G05B 19/05*   (2006.01)
  *H04L 41/044*  (2022.01)

(52) U.S. Cl.
  CPC .............. *F24F 11/83* (2018.01); *G05B 15/02* (2013.01); *G05B 19/054* (2013.01); *H04L 12/282* (2013.01); *H04L 41/044* (2013.01)

(56) References Cited

U.S. PATENT DOCUMENTS

| | | | |
|---|---|---|---|
| 2017/0017214 A1* | 1/2017 | O'Keeffe | G05B 15/02 |
| 2018/0102858 A1 | 4/2018 | Tiwari et al. | |
| 2018/0278462 A1* | 9/2018 | Bjontegard | H04L 41/044 |
| 2019/0086110 A1 | 3/2019 | Okita et al. | |
| 2019/0277523 A1 | 9/2019 | Wallace | |
| 2019/0377306 A1 | 12/2019 | Harvey | |
| 2020/0310394 A1* | 10/2020 | Wouhaybi | G05B 19/054 |

OTHER PUBLICATIONS

USPTO, International Search Report for International Patent Application No. PCT/US2021/054778, Jan. 28, 2022, 2 pages.
USPTO, International Search Report for International Patent Application No. PCT/US2021/054785, Jan. 12, 2022, 2 pages.
USPTO, Written Opinion for International Patent Application No. PCT/US2021/054785, Jan. 12, 2022, 8 pages.

\* cited by examiner

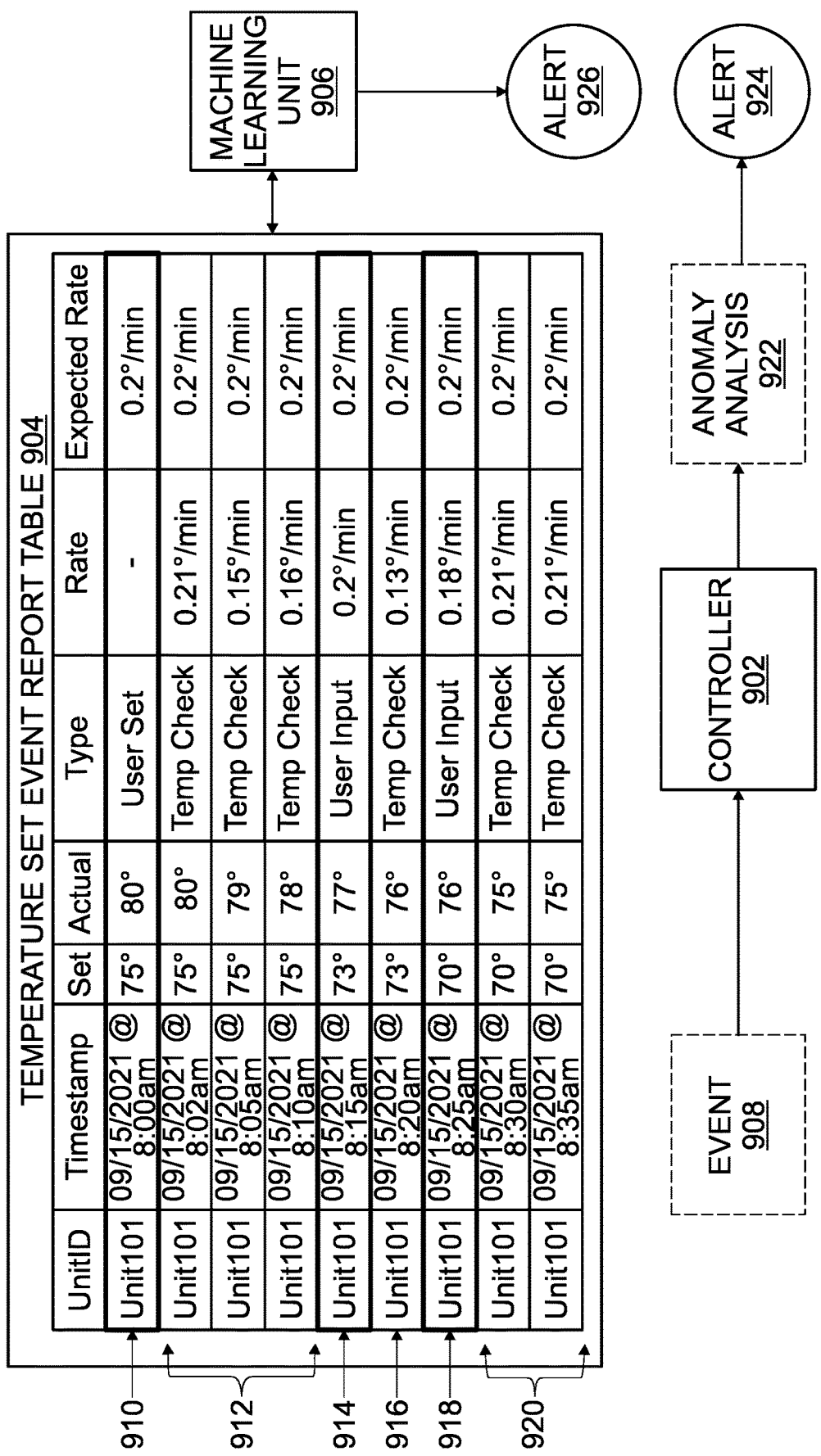

ELECTRICAL LOAD VALIDATION FOR A SMART SPACE IN A BUILDING

CROSS-REFERENCE TO RELATED APPLICATION

The present application is the U.S. national phase filing under 35 U.S.C. § 371 of International Patent Application No. PCT/US2021/054778, filed on Oct. 13, 2021, which claims priority under 35 U.S.C. § 119(e) and/or under PCT Article 8 to U.S. Provisional Patent Application No. 63/091,043, filed on Oct. 13, 2020, and entitled "MONITORING AND CONTROL SYSTEM AND METHOD FOR A SMART SPACE IN A BUILDING, SUCH AS A SMART LIVING, OFFICE, OR OTHER HUMAN-OCCUPIED SPACE." The contents of U.S. Provisional Patent Application No. 63/091,043 is incorporated herein by reference in its entirety.

BACKGROUND

Conventional construction is typically conducted in the field at the building job site. People in various trades (e.g., carpenters, electricians, and plumbers) measure, cut, and install material as though each unit were one-of-a-kind. Furthermore, activities performed by the trades are arranged in a linear sequence. The result is a time-consuming process that increases the risk of waste, installation imperfections, and cost overruns.

Traditional building construction continues to be more and more expensive and more and more complex. Changing codes, changing environments, and new technology have all made the construction of a building more complex than it was 10 or more years ago. In addition, trade labor availability is being reduced significantly. As more and more craftsmen retire, fewer and fewer younger workers may be choosing the construction industry as a career, leaving the construction industry largely lacking in skilled and able men and women to do the growing amount of construction work.

The construction industry is increasingly using modular construction techniques to improve efficiency. Modular construction techniques may include pre-manufacturing complete volumetric units (e.g., a stackable module) or one or more building components, such as wall panels, floor panels, and/or ceiling panels, offsite (e.g., in a factory or manufacturing facility), delivering the premanufactured modules or components to a building construction site, and assembling the premanufactured components at the building construction site. While modular construction techniques are more affordable and efficient (e.g., reduction in costs, construction waste, and time to build) relative to traditional construction techniques, challenges exist in providing sustainable and optimized building operations (e.g., energy efficiency, utilities monitoring, detecting maintenance issues, etc.) for buildings that have been constructed using modular construction techniques.

Currently existing buildings that have been manufactured using traditional construction techniques also face similar challenges as noted above. For instance, the existing built environment of various size residential, office, and other purposed buildings face the challenge of adapting to owner and occupant smart systems requirements not dissimilar to those that any pre-manufactured modular building confronts.

SUMMARY

One embodiment provides method to monitor and control operational aspects associated with a smart space in a building. The method includes: storing reference data associated with at least one device located in the space; obtaining real-time data from at least one sensor that monitors the at least one device; comparing the obtained real-time data with the stored reference data to determine whether the real-time data matches the stored reference data; in response to a determination that the obtained real-time data matches the stored reference data, validating that a first action directed towards at least one device has been performed as requested by a user of the space; and in response to a determination that there is a mismatch between the obtained real-time data and the stored reference data, determining that the first action is unsuccessfully performed and generating an alert to perform a second action to investigate the mismatch.

Another embodiment provides a non-transitory computer-readable medium having computer-readable instructions stored thereon, which in response to execution by at least one processor, cause the processor to perform or control performance of operations that include:

storing reference data associated with at least one device located in a space of a building;
  obtaining real-time data from at least one sensor that monitors the at least one device;
  comparing the obtained real-time data with the stored reference data to determine whether the real-time data matches the stored reference data;
  in response to a determination that the obtained real-time data matches the stored reference data, validating that a first action directed towards at least one device has been performed as requested by a user of the space; and
  in response to a determination that there is a mismatch between the obtained real-time data and the stored reference data, determining that the first action is unsuccessfully performed and generating an alert to perform a second action to investigate the mismatch.

Still another embodiment provides a monitoring and control system for a smart space in a building. The system includes: a storage device operative to store reference data associated with at least one device located in the space; at least one sensor communicatively coupled to the storage device and operative to monitor the at least one device and to provide real-time data associated with the monitored at least one device; and a monitoring and control engine communicatively coupled to the storage device and to the at least one sensor, and operative to: obtain the real-time data from the at least one sensor; compare the obtained real-time data with the stored reference data to determine whether the real-time data matches the stored reference data; in response to a determination that the obtained real-time data matches the stored reference data; validate that a first action directed towards the at least one device has been performed as requested by a user of the space; and in response to a determination that there is a mismatch between the obtained real-time data and the stored reference data, determine that the first action is unsuccessfully performed and generate an alert to perform a second action to investigate the mismatch.

BRIEF DESCRIPTION OF THE DRAWINGS

FIG. 9 is a diagram illustrating operation of an example temperature set-versus-anomaly detection system.

DETAILED DESCRIPTION

Figure 1:
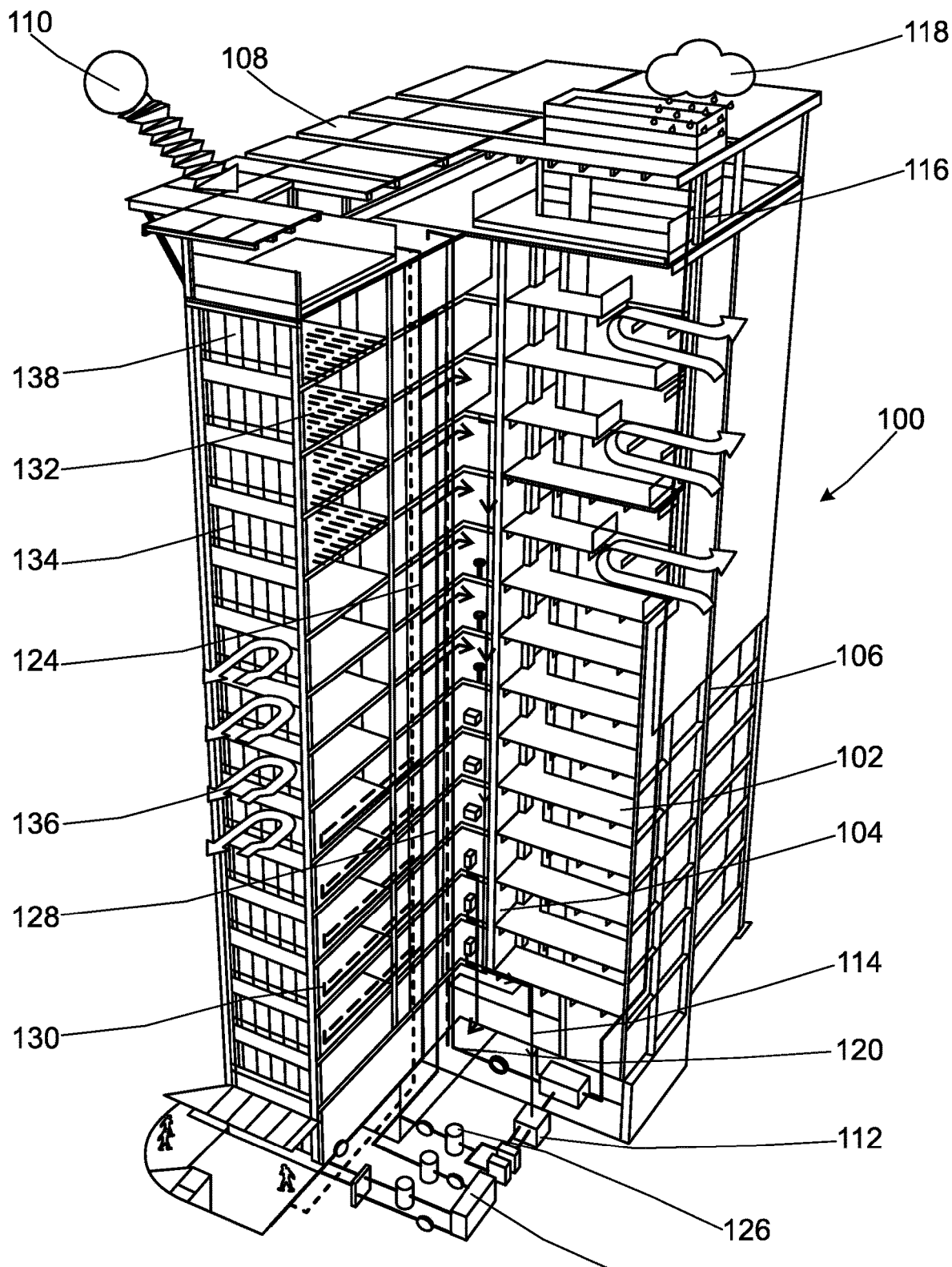
FIG. 1 is a cutaway view of an example building that can provide smart spaces that implement a monitoring and control method and system in accordance with some implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are contemplated herein.

This disclosure is drawn, inter alia, to methods, systems, products, devices, and/or apparatuses generally related to monitoring and controlling various operational aspects associated with any space within a building, including spaces intended for living, office, or other human-occupied uses (including storage) that has been constructed using modular construction techniques. Such operational aspects can include, but not be limited to, utilities such as lighting and temperature, blinds/windows, door operation, leaks or other intrusion detection, electrical and water usage, and various other operational aspects that affect any space including spaces designed for living, office or other human-occupied activities (including storage). Such operational aspects can be monitored and controlled, so as to improve energy efficiency, provide increased comfort and safety to the occupant(s), reduce costs of operations (e.g., living), provide better sustainability, improve maintenance turnaround times/results, and provide various other overall improvements in the operation and use of the living, office, or other human-occupied space. Accordingly, the embodiments disclosed herein provide a "smart" space for any purpose (e.g., living) that improves upon and addresses drawbacks associated with more traditional spaces.

For the sake of illustration and example herein, the spaces are described herein in the context of being smart living, office, or other human-occupied or otherwise occupy-able physical space. Such mention hereinafter of smart living, office, or other human-occupied space is merely for purposes of describing examples, and it is understood that the technology described herein may be applicable to other types of spaces in any building. It is understood that such spaces, including the smart living, office, or other human-occupied space, do not necessarily require constant human presence or even human presence at all. For instance, the technology described herein may be implemented in any space in any building where it would be desirable to have monitoring and control of operational aspects. Such human-occupied space may include any space that may be occasionally human-occupied (e.g., human occupy-able such as occupied only during daytime hours, occupied for only a few minutes when a user enters/exits but vacant otherwise, vacant for some period of time while awaiting a new tenant/occupant, etc.). Such space may also be storage space (such as a closet, storage room, etc.) that may or may not necessarily be sufficiently large in size to actually fit a human occupant inside, but would be considered to be human occupy-able in the sense that the storage space forms part of the space (e.g., forms part of a unit in a building) that is actually occupied by a person and/or that the person has control over the contents and operational features of the storage space.

In some implementations, because the designer/architect constructs the building and designs every aspect of the building, the designer/architect is best positioned to develop and build the underlying technology described herein to operate the building. In doing so, the designer/architect can ensure that the building is efficient in terms of energy usage, sustainability, comfort, and safety.

According to various embodiments, the monitoring and control of the operational aspects of a smart space (e.g., living space) may be facilitated through an application installed in or otherwise made available to a user device of an occupant (tenant) and/or a building manager. For example, the occupant and/or the building manager may operate a mobile telephone or other portable device having the application installed therein. Through the application, the occupant and/or the building manager may use the mobile telephone to remotely control the operation of various appliances, fixtures, etc. in the space (such as lights, blinds, doors, temperature settings, etc.). Thus, the user may control the operational aspects of the space while being present in the space itself, or away from (outside of) the space.

Furthermore, the application may provide the user with alerts and other information pertaining to the operational aspects of the building. For instance, the application may provide an audiovisual alert to the user to inform the user that the lights in the space have been successfully turned on, or that despite a command provided by the user via the application to turn on the lights, the energy usage of the lights in the space is indicating that one or more light bulbs may be broken and so a diagnosis/repair should be performed by the user or by maintenance staff of the building.

According to various embodiments, electrical load validation techniques may be used to determine whether devices in the space are operating properly (e.g., have turned on or off as instructed/initiated by the user), such as when the user may not be present at the space to visually observe the behavior of the devices. The validation techniques may compare existing electrical load information (e.g., as obtained by meters or other sensors) with reference electrical load information, so as to validate whether an action initiated by the user (e.g., turning on a light bulb) has indeed resulted in the intended condition (e.g., the light bulb being turned on).

According to various embodiments, set-versus-anomaly detection techniques may be provided. With such set-versusanomaly detection technique, user input may be used to determine whether a condition (such as temperature) in the space is not meeting an expected rate of change. For example, repeated adjustments of temperature settings by the user, within a period of time (timeframe), may indicate that the rate of change to heat/cool the space is not meeting comfort expectations of the user. If a difference is detected between an actual rate of change when compared to the expected rate of change (in combination with a number of user adjustments of the temperature set points during the timeframe), then an alert may be generated to notify maintenance staff to make adjustments to the central heating/cooling system (e.g., a central plant) of the building.

According to various embodiments, the monitoring and control aspects may be provided for a building that has been constructed using either pre-manufactured volumetric modules or pre-manufactured floor panels, demising walls, end walls, utility walls, and window walls for the smart living, office, or other human-occupied space.

In some embodiments, the smart spaces may be contained in a building having multiple stories, units, offices, conference rooms, amenity areas, residences, etc. that have pre-manufactured entire modules or are comprised of modular wall, ceiling, and floor panels that were constructed off-site and then assembled together at the building site. Thus, in some embodiments, when the building is being constructed at the building site, pre-assembled modules, as well as the wall, ceiling, and floor panels, may be installed at the building site, along with installing various components of the smart space that are involved in the monitoring/control of the operational aspects of the space and of various other parts of the building itself. The entire module, as well as the wall, ceiling, and floor panels, may provide a portion of an interior and/or exterior of the building. In some embodiments, the entire module, as well as the wall, ceiling, and floor panels, may be coupled to one or more structural frame members of the building. Some of the components to provide monitoring/control of the smart living, office, or other human-occupied space (such as sensors, cabling, and other monitoring components) may be pre-installed off-site in these premanufactured wall, ceiling, and floor panels and then operationally coupled together and activated at the building site. Alternatively or additionally, some of the components to provide monitoring/control of the smart space may be installed on-site and suitably/operationally coupled to (a) any appropriate element (e.g., windows, pipes, electrical wiring, etc.) that may be pre-installed in the premanufactured entire module, as well as wall, ceiling, and floor panels and/or coupled to (b) any other element external to the panels and contained within the space (e.g., plumbing fixtures, doors, blinds, etc.).

In other embodiments, the technology described herein may be retrofitted into existing buildings that have been built using standard techniques that construct the building on-site, without necessarily using any (or a relatively fewer number of) pre-manufactured entire modules or modular wall, ceiling, and floor panels that were constructed off-site. In addition to or alternative to retrofitting into existing buildings (whether or not such buildings include pre-manufactured modular components), the technology described herein may be installed in the building as the building itself is being constructed. Retrofitting may also be performed for buildings that were constructed entirely or mostly of pre-manufactured modules, where the original construction may not have included the monitoring and control components described herein at the time the buildings were constructed.

In some embodiments, the material composition of an entire module, as well as the wall, ceiling, and floor panels, may include steel. In some embodiments, the material composition may include aluminum. In still other embodiments, the wall, ceiling, and floor panels may be made from a variety of building suitable materials ranging from metals and/or metal alloys, to wood and wood polymer composites (WPC), wood based products (lignin), other organic building materials (bamboo) to organic polymers (plastics), to hybrid materials, earthen materials such as ceramics, or any other suitable materials or combinations thereof. In some embodiments, cement, grout, or other pourable or moldable building materials may also be used. In other embodiments, any combination of suitable building material may be combined by using one building material for some elements of the entire module, as well as the wall, ceiling and floor panels, and other building materials for other elements of the entire module, as well as the wall, ceiling, and floor panels. Selection of any material may be made from a reference of material options (such as those provided for in the International Building Code), or selected based on the knowledge of those of ordinary skill in the art when determining load bearing requirements for the structures to be built. Larger and/or taller structures may have greater physical strength requirements than smaller and/or shorter buildings. Adjustments in building materials to accommodate size of structure, load, and environmental stresses can determine optimal economical choices of building materials used for components in an entire module, as well as the wall, ceiling, and floor panels described herein. Availability of various building materials in different parts of the world may also affect selection of materials for building the system described herein. Adoption of the International Building Code or similar code may also affect choice of materials.

Any reference herein to "metal" includes any construction grade metals or metal alloys as may be suitable for fabrication and/or construction of the entire module, as well as wall, ceiling, and floor panels, and/or other components thereof described herein. Any reference to "wood" includes wood, wood laminated products, wood pressed products, wood polymer composites (WPCs), bamboo or bamboo related products, lignin products and any plant derived product, whether chemically treated, refined, processed or simply harvested from a plant. Any reference herein to "concrete" or "grout" includes any construction grade curable composite that includes cement, water, and a granular aggregate. Granular aggregates may include sand, gravel, polymers, ash and/or other minerals.

FIG. 1 is a cutaway view of an example building 100 that can provide smart spaces that implement a monitoring and control method and system in accordance with some implementations. The building 100 may be a multi-story building with one or more units (e.g., living, office, or other spaces) in each story. The space(s) in each story may be formed using either an entire pre-fabricated module or from one or more floor-ceiling panels 102 and wall panels 104. The floor-ceiling panel(s) 102 may form the floor of a first unit and a ceiling of a second unit below the first unit. The wall panels 104 may include interior walls (e.g., demising walls, corridor walls, etc.), window walls (e.g., exterior walls that accommodate one or more windows), utility walls (e.g., walls with utilities such as plumbing and electrical wiring contained therein), etc. According to one embodiment, the floor-ceiling panels 102 and wall panels 104 may be pre-manufactured off-site, and then installed on site by attaching to a metal structural frame 106 of the building 100.

According to various implementations, the building 100 may be constructed and operated using sustainable and energy efficient components. For example, solar panels 108 (photovoltaic arrays) may be provided on the roof and/or on exterior side walls and/or on balconies of the building 100, so as to capture and store solar energy 110 from the sun. The captured/stored solar energy 110 is renewable energy that may be converted to electricity for heating the building 100 or for other purposes, alternatively or additionally to using fossil fuels or electricity provided by a utility company.

The building 100 may also include a gray water system 112 that connects to gray water lines 114 from each of the living, office, or other human-occupied spaces on each story. The gray water lines 114 comprise pipes that carry relatively clean wastewater from bathrooms, sinks, washing machines, and kitchen appliances in the living, office, or other human-occupied spaces or from any other space irrespective of purpose of the space to the gray water system 112. The gray water system 112 may also be connected to rainwater harvesting lines 116 so as to receive rainwater 118 collected at the roof or other collection location (e.g., gutters) of the building 100. The gray water system 112 in turn may treat/purify the gray water, so as to yield relatively cleaner water that can be recirculated back to, for instance, living or office spaces. For example, cleaner/treated gray water (non-potable) can be recirculated by the gray water system 112 back to the living, office, or other human-occupied spaces, via water lines 120, for non-potable use (e.g., irrigation, toilet flushing, laundry, etc.) by the occupants of the spaces. For gray water that has been treated by the gray water system 112 into potable water, the gray water system 112 can provide the potable water to a cold water system 122, which in turn can supply cold water to (a) any space via cold water lines 124 or (b) a hot water system 126 that can supply hot water to any space via hot water lines 128.

The gray water system 112, cold water system 122, and hot water system 126 may be located in one or more utility rooms (control rooms) of the building 100, which may be present in a basement or other area of the building 100. The gray water system 112, cold water system 122, and hot water system 126 in the utility room(s) may include valves, pumps, re-circulators, tanks, meters, heaters, coolers, boilers, and various other components (including sensors such as water usage meters or thermometers and other components used by the monitoring and control method/system of the present embodiments) to enable the water to be circulated/recirculated to the spaces, including water at certain cooled or heated temperatures.

As previously described above, treated gray water may be provided to the cold water system 122 for recirculating back to the spaces. In addition, the cold water system 122 also receives potable cold water from a public water supply (such as from a municipal water utility), and provides the cold water to the spaces for use by the occupants. For instance and in addition to providing cold water via cold water lines 124 to the spaces and to the hot water system 126 for consumption (e.g., drinking, washing, etc.) by the occupants, the cold water lines 124 may provide the cold water to a cooling system 130. The cooling system 130 may include pipes installed in a ceiling panel of each unit and which recirculate cold water, so as to provide radiant cooling or fan-assisted cooling to the unit. Thus, with the use of recirculated cold water for cooling, the building 100 provides a more sustainable and energy efficient cooling mechanism, as compared to using conventional air conditioning units.

Analogously, the hot water system 126 provides (via the hot water lines 128) hot water to the spaces for use by the occupants for drinking, washing, etc. Moreover in some implementations, the hot water lines 128 provide the hot water to a radiant heating system 132 that comprises pipes installed inside of the floor panels. The heat radiates from the hot water through the floors, and is then recirculated back to the hot water system 126 for re-heating when the water cools. Thus, with the use of recirculated hot water for heating, the building 100 provides a more sustainable and energy efficient heating mechanism, as compared to conventional heating systems.

According to various embodiments, the hot water system 126 may include boilers, hot water heaters (e.g., with tanks and tankless), pumps, or other centralized mechanisms to provide hot water to the living, office, or other human-occupied spaces. Alternatively or additionally, each individual unit (living, office, or other human-occupied space) itself may have its own independent source of hot water or room heating/cooling source, such as a hot water heater (tank or tankless), heat pump, electric space heater, fireplace, baseboard heater, air conditioner, cooling fans, ductless mini-split, furnace, electric wall heaters, other types of forced-air or radiant systems, etc.

The hot water system 126, the cold water system 122, the hot water lines 128, the cold water lines 126, and related components of various embodiments that perform heating/cooling of spaces may form part of a pre-installed piping system provided by a central plant for the building 100, in that the controls/source of the heating/cooling originate at a centralized location (e.g., at a utility room) and the heating/cooling is then distributed throughout the building 100 via pipes/lines of the piping system. A central plant may be comprised of one or more boilers or air source heat pumps (ASHPs) that may be controlled to provide heated water. The ASHP(s) may also provide chilled water. Another example of a central plant or centralized system is a central heating ventilation air conditioning (HVAC) system.

As described previously above, the radiant cooling system 130 may be used to provide cooling for the living, office, or other human-occupied spaces. Other techniques may be used alternatively or additionally in the building 100 to provide cooling for the office or other human-occupied spaces. For instance, each of the units may have windows 134 that can be opened to provide natural ventilation 136. The windows 134 may be made of specialized high-performance glass panes that reflect or block heat from the sun's rays, and the amount of reflection/blockage may be adjustable (increased or decreased) in some types of glass, such as by changing the amount of tinting, so as to account for varying weather conditions and ambient temperatures. Moreover, automatic roller blinds 138 may be provided for each of the windows, such that the blinds may be raised or lowered (or adjusted in their slat angles, if blinds with vertical/horizontal slats are used) depending on the desired amount of sunlight to be blocked from entering the living, office, or other human-occupied space.

The building 100 may have other utilities, operational aspects, features, etc., which are not shown or described in further detail in FIG. 1, for the sake of brevity. It is understood that the building 100 of FIG. 1 is merely an example, and that other buildings may have additional and/or different utilities, operational aspects, features, configurations, etc.

Figure 2:
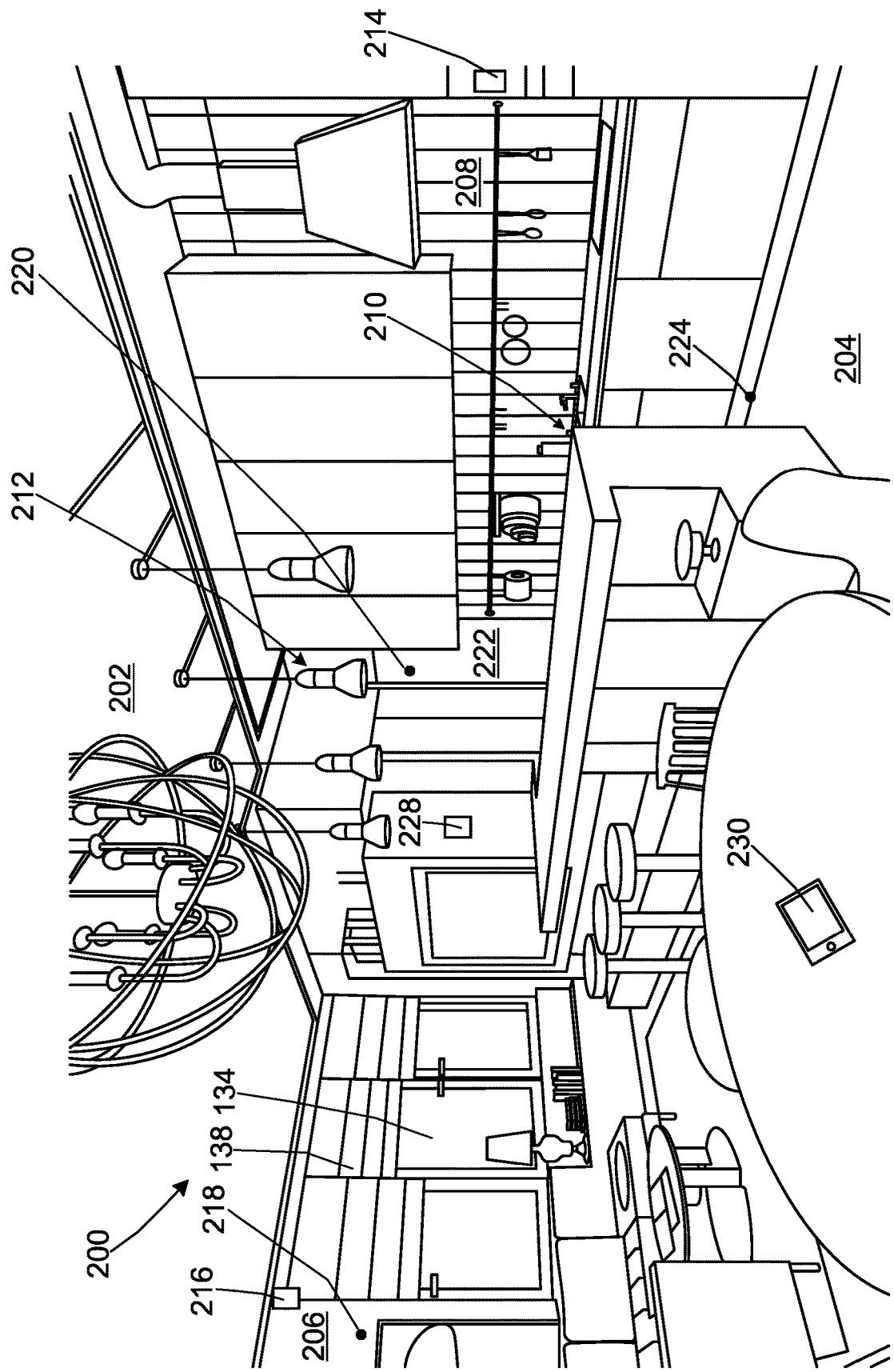
FIG. 2 is a partial view of an example space in the building of FIG. 1 in accordance with some implementations.

FIG. 2 is a partial view of an example space, such as a living, office, or other human-occupied space 200 in the building 100 of FIG. 1 in accordance with some implementations. The space 200 of FIG. 2 can encompass, for example, portions of the kitchen, dining room, and family room areas of a unit occupied by a tenant. The space 200 may be defined by one or more ceiling panels 202, floor panels 204, and wall panels such as a window wall panel 206 and a utility wall panel (or other interior wall panel, including a demising wall panel) 208. These various panels may be pre-manufactured panels that are constructed off-site, and then brought to the building site for installation/assembly. For instance, the interior studs and wall boards of multiple panels may be assembled off-site (including installation of utilities such as pipes and wiring inside of the utility wall panel 208), and then the panels are attached to the structural frame 106 and connected together at the building site. Decorative/functional finish panels may then be attached to the wall boards of the panels that face the interior of the space 200, and fixtures, utilities, etc. may be installed.

For example, plumbing fixtures 210 (such as faucets, hot/cold water supply lines, drain pipes, etc.) in the space 200 may be coupled to the cold water line 124, the hot water line 128, and the gray water line 112 (or to a sewer drain or black water line) that are contained inside of the utility wall panel 208. Similarly, the space 200 may have electrical fixtures such as lighting 212 that is coupled to electrical wiring contained inside the utility wall panel 208. The lighting 212 may be turned on, turned off, dimmed, etc. using a wall switch 214 and/or a remote control device.

The space 200 includes windows 134 that are fitted into openings of the window wall panel 206, and the automatic roller blinds 138 can be positioned over the windows 134. A motorized blind control unit 216 is provided to control the movement (e.g., raising/lowering) of the automatic roller blinds 138, as well as to sense/detect the level of the automatic roller blinds 138. The motorized blind control unit 216 can be operated using a wall switch (such as the wall switch 214) and/or by using a remote control device.

A plurality of sensors may be placed in the space 200 to detect various activities. For example, a motion sensor 218 detects motion inside of the space 200 (such as motion of occupants, pets, or intruders). A door sensor 220 detects the opening and closing of a door 222. A leak sensor 224 detects when a water leak occurs in the plumbing fixtures 210. Other types of sensors can be provided in the space 200. Moreover, a thermostat 228 may be provided in the space 200 to monitor the ambient internal temperature, and to control temperature heating/cooling provided via the radiant heating system 132 and the radiant cooling system 130.

Other types of sensors (not shown) may be provided in the space 200. For instance, a humidity sensor can monitor the humidity level in the space 200. An audio sensor can monitor voices, music, and other audio that can be heard within the space 200. An image sensor (e.g., a camera) can also be provided for surveillance or other purposes. The various sensors shown and described herein are just a few examples.

According to various implementations, one or more of the utilities, fixtures, controls, sensors, etc. shown and described above with respect to FIG. 2 can be communicatively coupled (wired and/or wirelessly) to head-end equipment in the utility/control room of the building 100. For example and as will be described next below, the one or more of the utilities, fixtures, controls, sensors, etc. can be coupled via an internet of things (IoT) data connectivity aggregation device and/or via other network devices to the head-end equipment. The head-end equipment can then provide an interface to applications installed in the user device of a building manager for the building 200 and/or installed in the user device of an occupant of the living, office or other human-occupied space 200, so that the building manager and/or occupant can use their respective application to monitor and operate the one or more of the utilities, fixtures, controls, sensors, etc.

For example, the application may be installed in a mobile communication device 230 of the occupant of the space 200. The occupant may use the application to communicate with the head-end equipment to receive monitored information from the sensors, to receive alerts, to control the operation of the utilities, fixtures, controls, sensors, etc., to initiate diagnosis and remedial actions, etc. Alternatively or additionally, the mobile communication device 230 can perform these actions directly without necessarily communicating via the head-end equipment. For instance, the occupant may use the mobile communication device 230 to directly send a command to the motorized blind control unit 216 to raise/lower the automatic roller blinds 138, rather than having to first route the command to the head-end equipment which would then issue a command to the motorized blind control unit 216 to raise/lower the automatic roller blinds 138. The user/occupant may operate the mobile communication device 230 while being actually present in the space 200, or while away from the space 200 (such as from a different room or other part of the building, outside of the building or other remote location, etc.).

Figure 3:
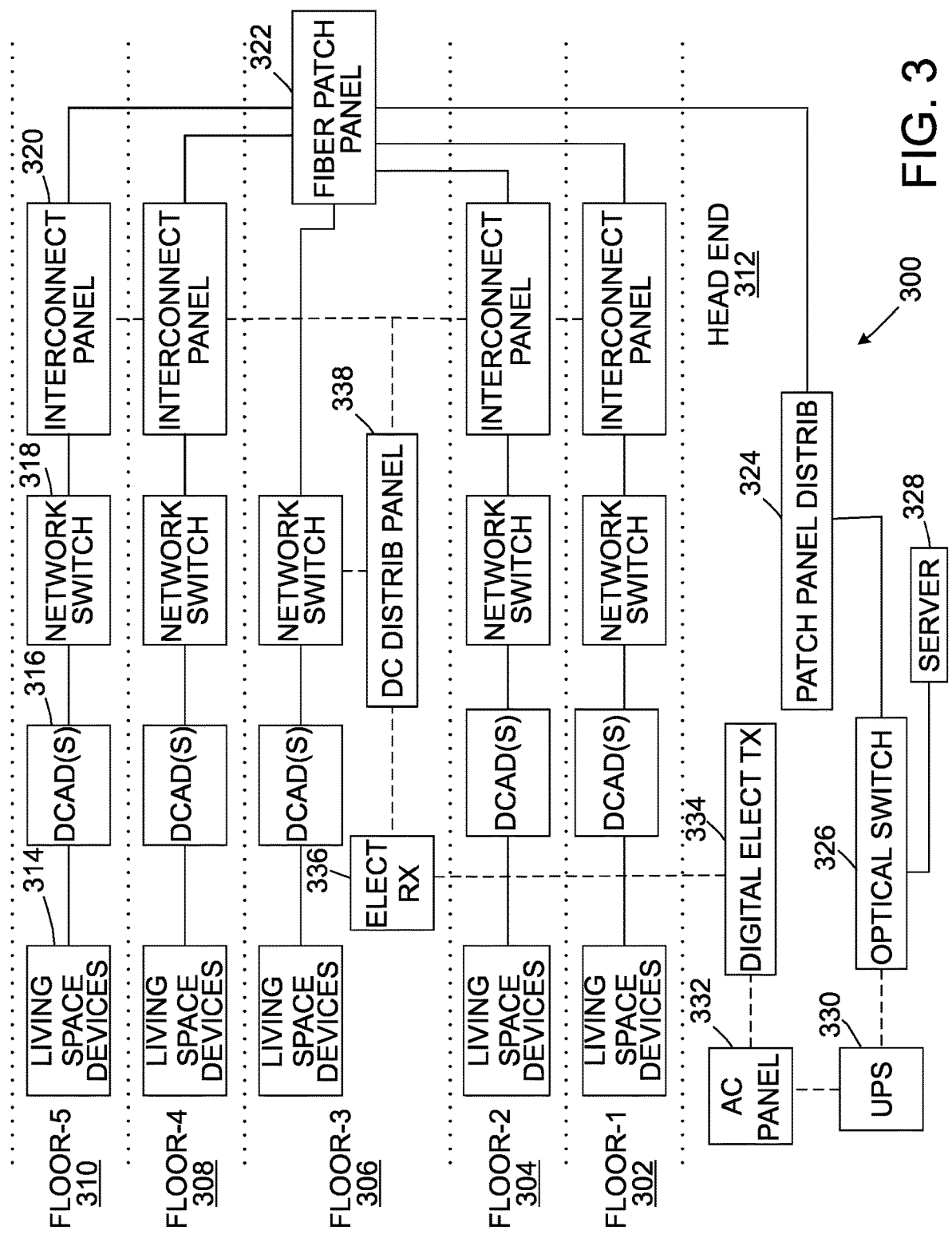
FIG. 3 is a block diagram showing components of an example monitoring and control system for spaces in the building of FIG. 1 in accordance with some implementations.

FIG. 3 is a block diagram showing components of an example monitoring and control system 300 for spaces, such as living, office, or other human-occupied spaces, in the building of FIG. 1 in accordance with some implementations. For instance, the system 300 may provide monitoring and control of various operational aspects of the space 200 shown in FIG. 2.

FIG. 3 shows components of the system 300 that may be provided for five floors, such as floor-1 to floor-5 (respectively labeled as 302 to 310 in FIG. 3). Five floors are represented in FIG. 3 purely for illustrative purposes—the building 100 may have fewer or greater than five floors. Each floor may in turn provide a single living, office, or other human-occupied space (e.g., a single unit for a single family/tenant) or multiple living, office, or other human-occupied spaces (e.g., multiple units for multiple families/tenants).

FIG. 3 further shows components of the system 300 that may be provided at a head end 312. The head end 312 may be located, for example, in a utility room of the building 100. Such utility room may also house the controls and other components of the gray water system 112, cold water system 122, and hot water system 126 such as shown in FIG. 1. The components at the head end 312 may be electrically and/or otherwise communicatively coupled to the components of the system 300 that serve floors 302-310, which will be explained next below with respect to floor-5 310 (and the same/similar description would apply to the other floors).

Specifically and with respect to floor-5 310, there are various space devices 314 that located in the particular living, office, or other human-occupied space (e.g., in the space 200 in FIG. 2). For instance, the space devices 314 can include lighting, plumbing, blinds, sensors, thermostats, radiant heating/cooling elements, internet of things (IoT) devices, energy usage meters installed in electrical panels for a space, water usage meters, control units and switches and other various components and sub-components thereof that can be wirelessly and/or wire connected to a network for communication purposes and that can be monitored/controlled. Examples of such space devices 314 were previously shown and described above with respect to FIGS. 1 and 2.

The space devices 314 in floor-5 310 are coupled (via wireless and/or wired connections) to one or more data connectivity aggregation devices (DCADs) 316. The data connectivity aggregation device(s) 316 may include, for instance, power-over-Ethernet (PoE) data connectivity aggregation devices that connect cabling to the space devices 314 for both power and communication. POE is just one example of a technique to provide both power and communication capability. In other embodiments, other types of cabling techniques and associated devices may be used to provide power (including low power DC) and/or communication for the space devices 314. Moreover, some embodiments may utilize separate links (e.g., separate wires or cables or wireless links) for power and for communication, instead of using a single cable or link for both.

The data connectivity aggregation device(s) 316 may in turn be coupled to at least one network switch 318, which connects power and communication to the data connectivity aggregation device(s) 316 and to space devices 310 located in a single living, office, or other human-occupied space. The network switch 318 may in turn be coupled to an interconnect panel 320, which operates as an interconnection location for other network switches, data connectivity aggregation devices, and living, office, or other human-occupied space devices in other units (living spaces) in the same floor-5 310. Via optical cabling for communications, the interconnect panel 310 for floor-5 310 and the interconnect panels for the other floors are coupled (as shown in FIG. 3) to a fiber patch panel 322. While FIG. 3 shows optical fiber cabling, other types of cabling can be used alternative to, or in addition to, optical cabling.

The fiber patch panel 322 is coupled via optical cabling to a patch panel distribution unit 324 and to an optical switch 326, both of which are located at the head end 312. The optical switch 326 is in turn coupled to a server 328 at the head end 312. In some embodiments, the server may be located remotely from the head end 312, and/or multiple servers may be provided on-site, off-site, or both on-site and off-site. As will be described later below, the server 328 is able (via the various communication links shown in FIG. 3) to receive monitoring data pertaining to the space devices 314 and to send commands to the space devices 314 to control their operation.

The head end 312 may have power sources to supply power to the various components of the system 300. For example, an uninterruptible power supply (UPS) 330 and/or other power source may supply electricity to the various components of the system 300. In some implementations, the electricity may be provided, via an alternating current (AC) panel 332, to a digital electricity transmitter 334 that transmits digital electricity (that combines data and DC power into packets) to a digital electricity receiver 336 located in one or more of the floors, such as at floor-3 306. The digital electricity receiver 336 then provides, via a direct current (DC) distribution panel 338 and the interconnect panels, the digital electricity to the various network switches so as to power the network switches, data connectivity aggregation devices, and appropriate space devices. Some of the electrical cabling, from the UPS 330 to the interconnect panels and network switches, is depicted with dashed lines in FIG. 3.

Figure 4:
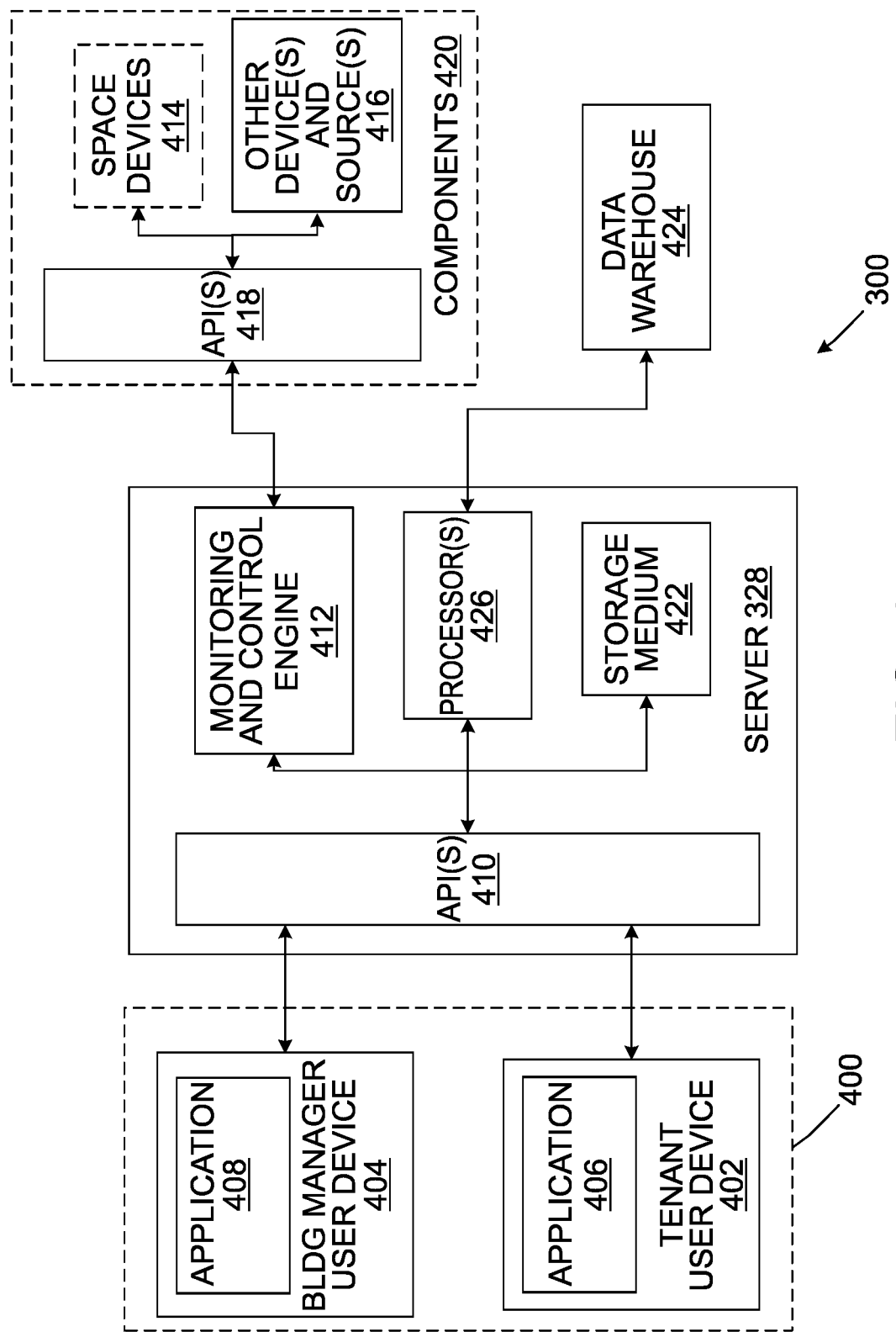
FIG. 4 is a block diagram showing components of an example monitoring and control system for spaces in the building of FIG. 1 in in accordance with some implementations.

FIG. 4 is a block diagram showing components of the monitoring and control system 300 for spaces, such as living, office, or other human-occupied spaces, in the building 100 of FIG. 1 in in accordance with some implementations. More specifically, FIG. 4 shows further details of the components of the server 328 at the head end 312 of FIG. 3 and the various devices/components that communicate with the server 328.

For instance, user devices 400 (such as smart phones, laptops, desktops, computer, or other user communication device) communicate remotely (via wireless and/or wired connections) with the server 328. Such user devices can include a tenant user device 402 (such as the mobile communication device 230 shown in FIG. 2) operable by each of the tenants/occupants of the living, office, or other human-occupied spaces or automatically controlled, and a building manager user device 404 operable by the building manager, owner, etc. of the building 100 or automatically controlled. The user devices 402 and 404 each have applications 406 and 408 respectively installed therein, for use in communicating with the server 328 for purposes of monitoring and controlling operational aspects of the living, office, or other human-occupied spaces. The applications 406 and 408 can comprise software or other computer-readable instructions stored on a tangible non-transitory computer-readable medium of the user device and executable by a processor of the user device, so as to perform the various operations described herein for monitoring and controlling the operational aspects of the living, office, or other human-occupied spaces.

The applications 406 and 408 communicate, via one or more application program interfaces (APIs) 410, with a monitoring and control engine 412 residing at the server 328. The engine 412 is configured to perform, among other things, receiving and analyzing data provided by space devices 414 (such as the various sensors, IoT devices, energy usage meters, thermostats, controllers for radiant heating/cooling elements, plumbing, blinds, water usage meters, etc. located in living, office, or other human-occupied spaces) and by other device(s)/source(s) 416 (such as temperature sensors outside of the building 100, weather reports, utility metering information and other information from utility providers of the building 100, third party security/surveillance companies, internet web pages, etc.). The engine 412 may communicate with the space devices 414 and/or the device(s)/source(s) 416 directly or via one or more APIs 418, all of which are collectively grouped together as components 420 within a dashed box in FIG. 4.

The engine 412 may be configured to perform additional operations, including but not limited to, determining whether monitored data from the components 420 is within or outside of threshold levels, providing a confirmation to the applications 406 and 408 if the monitored data is within the expected/threshold levels or an alert to the applications 406 and 408 if the monitored data is outside of the expected/threshold levels, initiating a remedial action when needed (e.g., deactivating a utility, generating a service request to maintenance staff, etc.), providing the occupant or building manager with suggestions for an action (e.g., decrease/increase the room temperature or other change in usage pattern, raise the blinds, check for a leak, check for a broken light bulb, etc.), storing data in a storage medium 422 and/or in a data warehouse 424 for use in machine learning algorithms, performing testing and calibration of devices in a space so that data pertaining to the devices (such as wattage or other electrical information information) can be stored in the data warehouse 424 for reference, and so forth.

The engine 412 of an embodiment may be in the form of software/code or other computer-readable instruction stored in the storage medium 422 and executable by one or more processors 426 to perform the various operations described herein. While shown as a discrete individual component in FIG. 4, the engine 412 of some implementations may be made up of several individual components that together collectively perform the various operations of the engine 412 described herein. Moreover in some embodiments, functionality of the engine 412 may be provided by an application in a user device (e.g., the application 408 that resides in the user device 404), alternatively or additionally to being provided at/from the server 328.

The data warehouse 424 may reside at the server 328, may reside outside of the server 328 elsewhere in the head end 312, or may reside offsite from the building 100. Among other things, the data warehouse 412 may store: technical specifications for the various space devices 414 (such as wattage per light bulb as reference value), historical temperatures in the living, office, or other human-occupied spaces during different parts of the day/month/year, historical weather patterns outside of the building 100 during different parts of the day/month/year, occupant-related information (such as name, contact information, space environmental settings preferences, etc.), space-related information (such as historical utility usage data, outage reports, surveillance reports, maintenance/repair history, etc.), data harvested from web sites of utilities and device manufacturers, training/reference data for machine learning techniques, and any other information/data that may be useful to the engine 412, the occupants/tenants, and the building manager in connection with monitoring and controlling the operational aspects of the living, office, or other human-occupied spaces.

The various communications between the components/devices in FIG. 4 may be secure. For example, data communicated between the engine 412 and the applications 406/408 may be encrypted. Alternatively or additionally, passwords or other types of security mechanism may be implemented to restrict access to the engine 412, the data warehouse 424, the applications 406/408 to only authorized users. With such security mechanisms in place, a particular occupant's living, office, or other human-occupied space data and related communications can be kept confidential from other tenants in the building 100 and/or from the building manager and/or from unauthorized persons inside or outside of the building 100. Similarly, the building manager's data and related communications can be kept confidential from tenants and/or from unauthorized persons inside or outside of the building 100.

As further examples of how the application 406, the engine 412, the data warehouse 424, and the components 420 may cooperate with each other for controlling and monitoring, the occupant (e.g., a tenant) of the space 200 may operate the application 406 installed in the tenant user device 402 to use the following example features/functions:

The occupant may operate a dashboard in a user interface of the application to view high-level metrics on the temperature, energy usage, water usage, lighting status, and window covering position, as well as the performance of the space 200 versus other tenants and building averages (e.g., anonymously);

The application 406 may provide suggestions such as "Lower your blinds to keep your space cool" etc.

The occupant is able to view a list of all connected devices, such as the thermostat 228, door sensor 220, occupancy sensor 218, leak sensor 224, energy meter, lighting 212, and automatic roller blinds 138;

The occupant is able to control all lights and blinds in the space 200 and has the ability to view water usage and energy use data;

The user interface of the application 406 provides the occupant with a quick view of all monitored/controlled devices in the space 200, and the occupant can toggle devices on or off, or up or down, etc.;

The occupant can program "pre-sets" to create and schedule groups of devices such as "nighttime", which turns off the lighting 212 and lowers the automatic roller blinds 138;

The occupant is able to add a device to an existing pre-set;

The occupant is able to create, read, update, and delete (CRUD) "pre-sets";

The occupant is able to assign a schedule for a pre-set that can be based on time, date, or a combination of these;

The occupant is able to activate and de-activate pre-sets;

The application 406 has a settings area where the occupant can edit information and reset passwords; and The occupant is able to lock/unlock the door 222.

Analogously, the building manager of the building 100 may also operate the installed application 408 at the building manager user device 404 to use the following example features/functions:

The application 408 provides a separate reporting area (such as a table) that collects data from the engine 412, the components 420, and the data warehouse 424, and reports the data to an administration/management system of the building manager;

The reporting area may report any appropriate data from third-party vendors that provide the various space devices, such as sensors, meters, network devices, lights, blinds, plumbing, etc. in the living, office, or other human-occupied space.

Managers will have a building dashboard that shows metrics such as electrical use, water use, equipment health, leak detection etc.;

The application 408 receives alerts from the engine 412 if there are detected water leaks, high water usage, high energy usage, etc.;

The application 408 provides a dashboard that show metrics with sortable data and graphing tools to help the building manager to visualize the data;

Within the building dashboard, the building manager is able to drill down into each metric so as to look deeper into the data (e.g., floor-by-floor energy data, south side versus north side climate data, results from subsequent controlling actions, etc.);

The application 408 has a background process that runs pre-defined logic on the reporting table and builds larger and/or different reporting metrics;

The application 408 and/or the engine 412 has algorithms that may be based on artificial intelligence (AI) so as to generate suggestions for improving building efficiency;

The building manager is able to create and retrieve reports on the raw data in the system 300;

The building manager is able to create publicly accessible reports for the building to be displayed on a lobby television/monitor, on a web page for the building 100, etc.; and The building manager is able to interface with mechanical equipment, for purposes of control, change/adjustment, managing temperatures, health reporting etc.

Figure 5A:
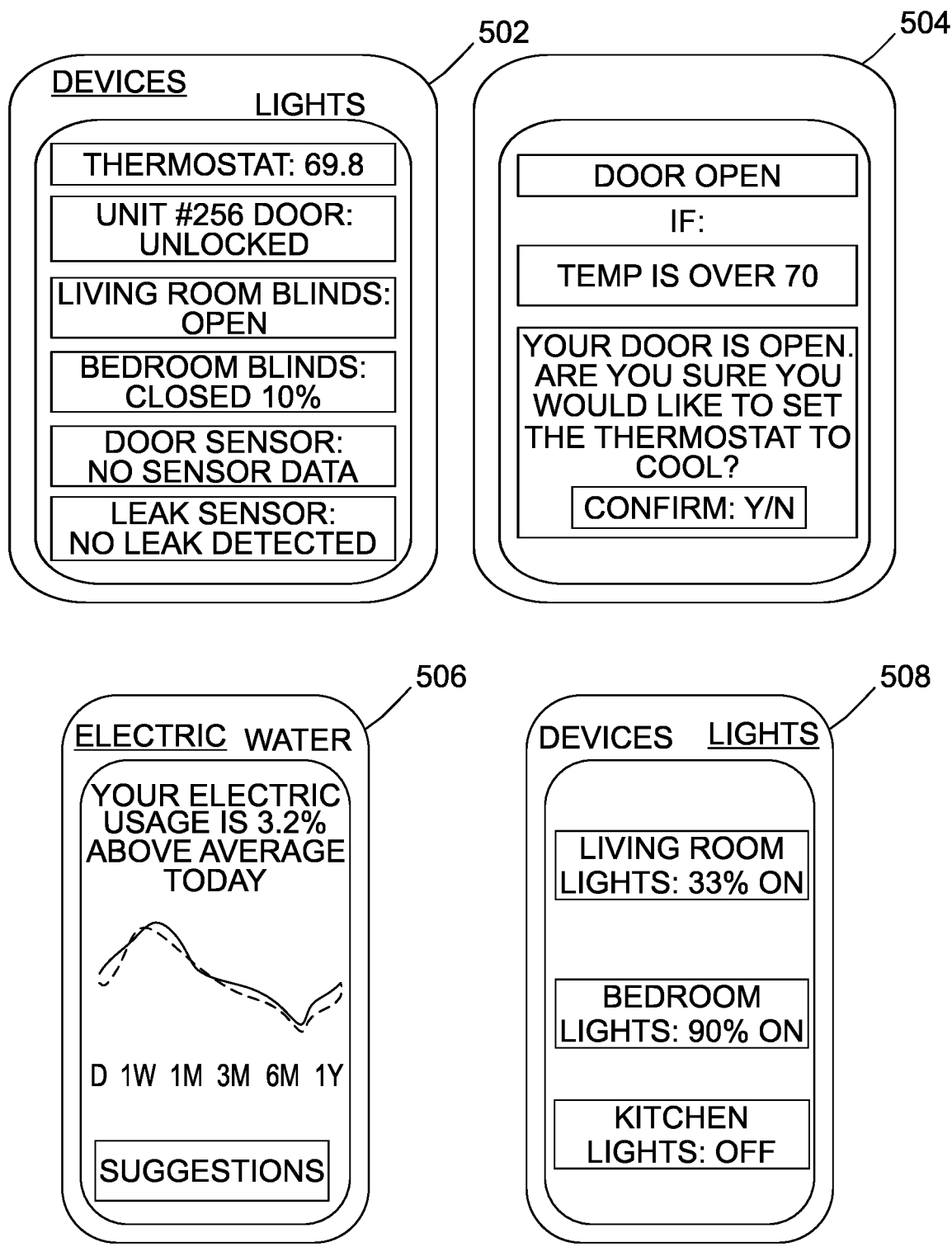
FIGS. 5A-5C show example screenshots of an example user interface on a user device in accordance with some implementations.
Figure 5B:
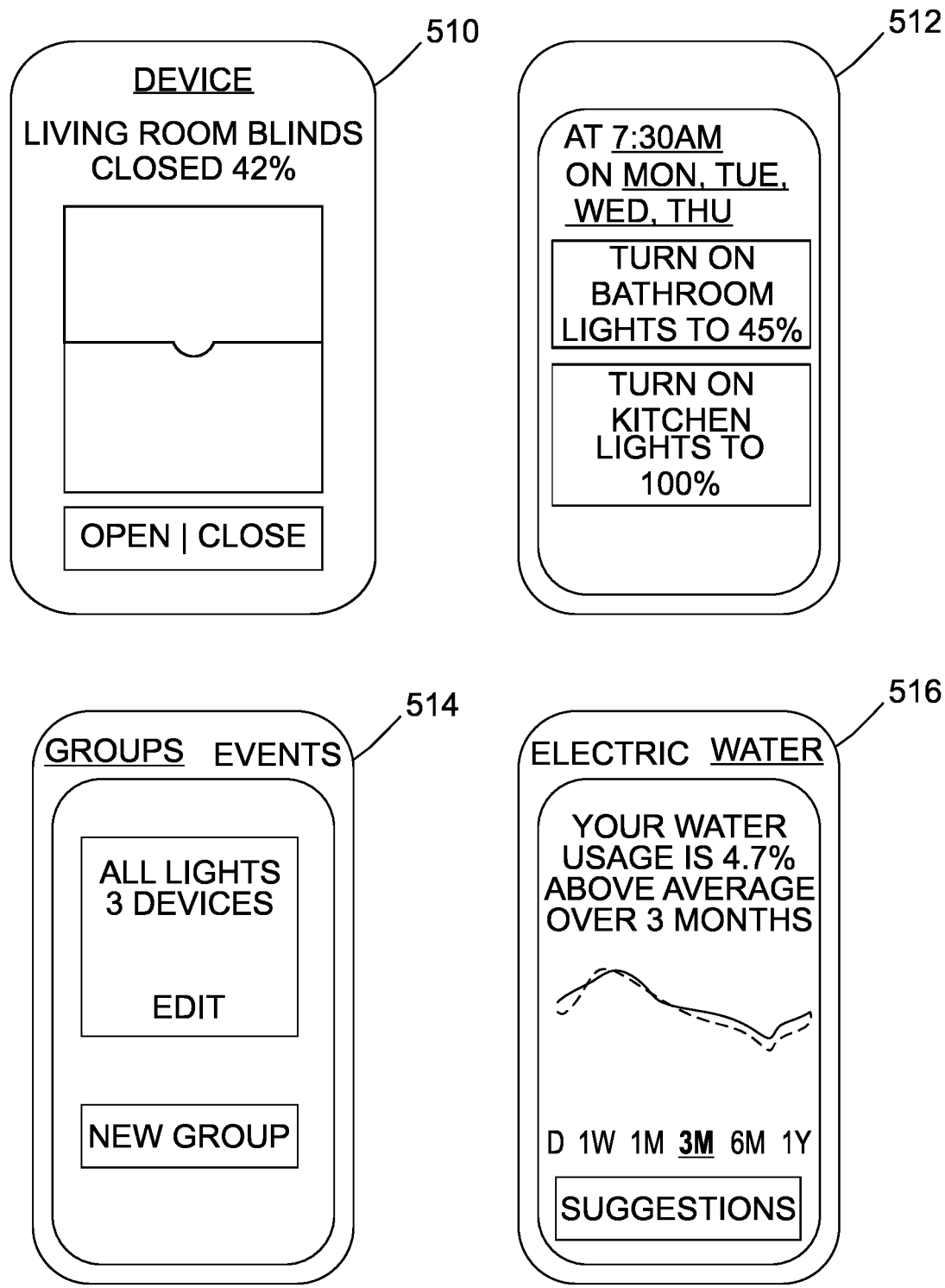
Figure 5C:
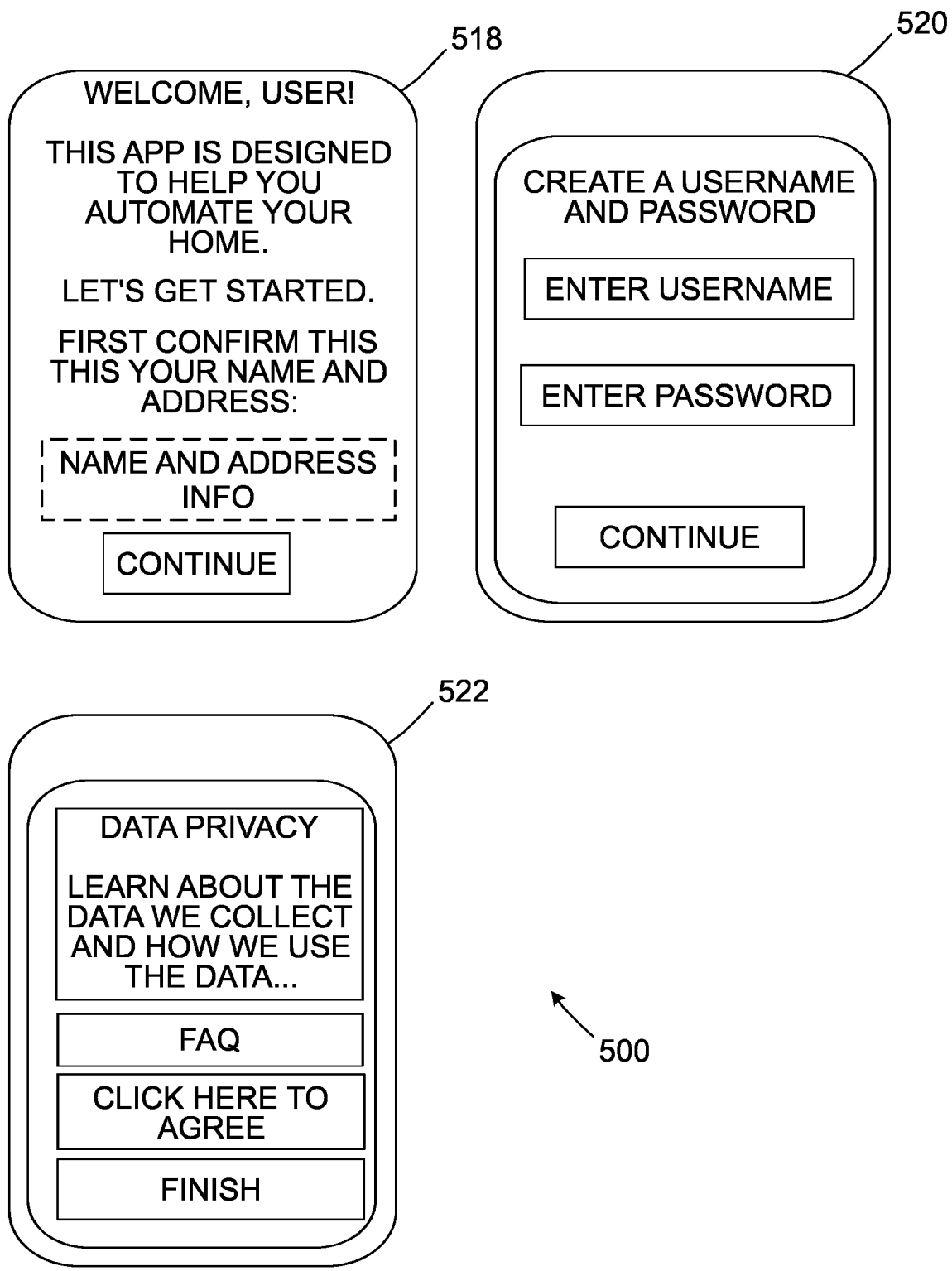

At least some of the above features/functions are shown next in FIG. 5A-5C. Specifically, FIGS. 5A-5C shows example screenshots 500 of an example user interface on a user device (e.g., the tenant user device 402 or the mobile communication device 230) of an occupant (tenant) that depict some of the features/functions described above, in accordance with some implementations. The screenshots 500 are provided by a user interface of the application 406.

Screenshot 502 shows some sensor data and controls (in the form of buttons or some other form of on-screen input/output graphical element) for various space devices in an example unit #256: thermostat=69.8 degrees Fahrenheit (F); door of unit #256=unlocked; living room blinds=open; bedroom blinds=closed 10%; door sensor=no sensor data; and leak sensor=no leak detected.

Screenshot 504 shows example controls and data pertaining to opening a door. For instance, the user can command the door 222 to be kept open if the space temperature is over 70 degrees. Moreover, an alert can be provided to the occupant such as "Your door is open. Are you sure you would like to set the thermostat to cool? Confirm Y/N". Thus, this data/prompt is intended to urge the occupant to control the temperature in the space in a more energy efficient manner, such as by not turning on space cooling (e.g., air conditioning) if the door is open.

Screenshot 506 shows utility (e.g., electricity or water) usage data over time. A message can be provided to the occupant, such as "Your electric usage is 3.2% above average today." This alert provides a suggestion button so as to prompt the occupant to operate appliances in a more energy efficient and/or cost efficient manner.

Screenshot 508 shows example controls and sensor data for lighting: living room lights=33% on; bedroom lights=90% on; and kitchen lights=off. The occupant may operate the user interface to turn off/on lights to change these percentages in each of the rooms.

Screenshot 510 shows sensor data and control for living room blinds: living room blinds=closed 42%; and controls to increase/decrease the percentage of the opening/closure. Screenshot 512 shows lighting settings that can be specified by the occupant for time of day, day, and location, such as "At 7:30 am, On Mon, Tue, Wed, Thu: Turn on bathroom lights to 45% and Turn on kitchen lights to 100%".

Screenshot 514 shows example "pre-sets" to create and schedule groups of devices, such as lights to be turned on/off at a particular time. Screenshot 516 shows utility (e.g., water) usage data over time. A message can be provided to the occupant, such as "Your water usage is 4.7% above average over 3 months." This alert thus provides a suggestion to the occupant to use water in a more volume efficient and/or cost efficient manner.

Screenshots 518, 520, and 522 show various information/steps that may be presented to a new occupant (incoming tenant) that is being on-boarded to the monitoring and control system 300. Such information may include a welcome screen in screenshot 518, a prompt to create a username and password in screenshot 520, and data use/privacy policy and frequently asked questions (FAQ), along with a button that the user can press to agree to terms and conditions, in a screenshot 522.

It is understood that the screenshots 500 in FIGS. 5A-5C are just but a few examples. Various other screenshots can have different layouts, information, functionality, etc. provided by the user interface of the application 406. Analogous screenshots and related data and functionality can be provided by the application 408 for the building manager.

Figure 6:
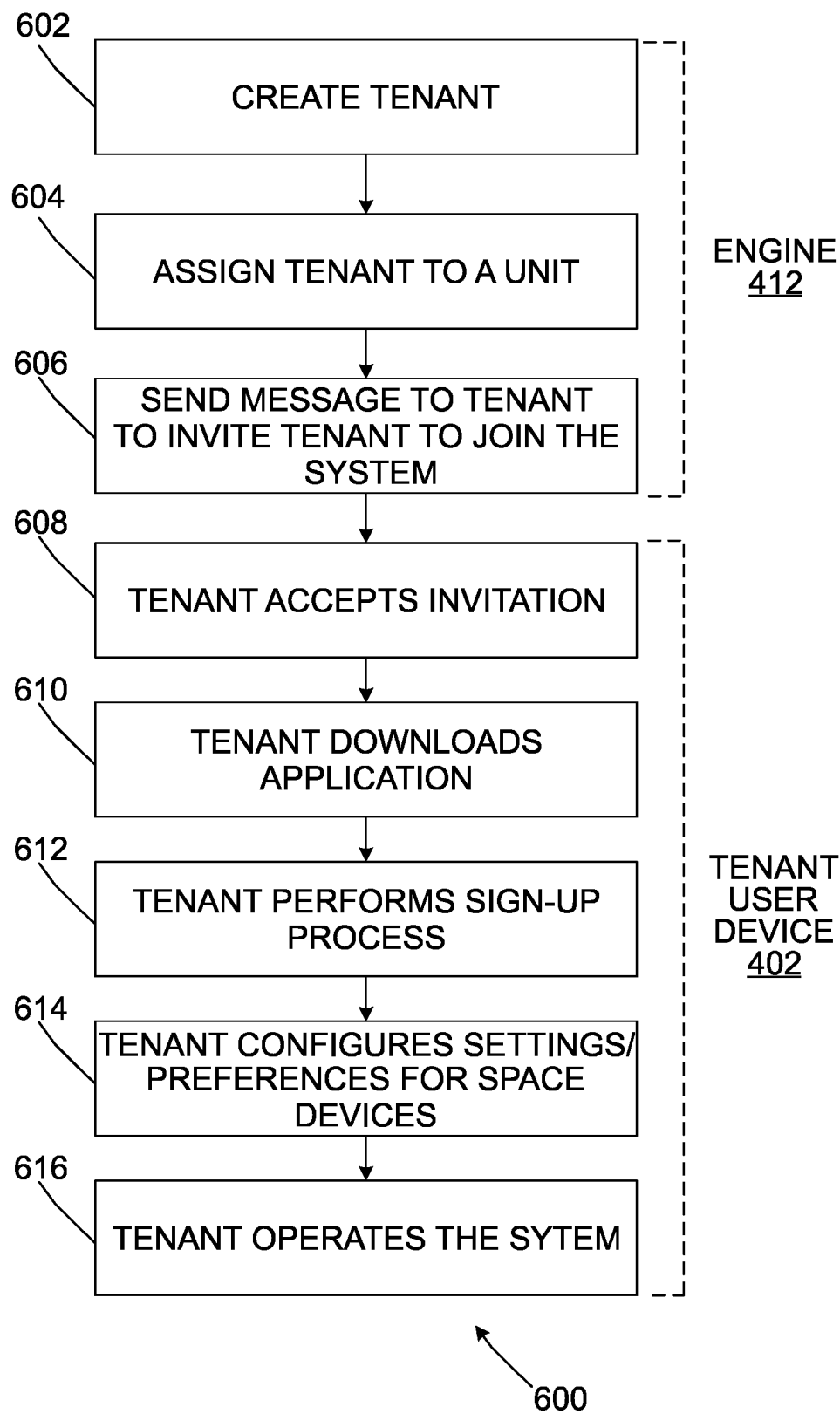
FIG. 6 is a flowchart of an example method to on-board an occupant of the building of FIG. 1 so as to be able to access and use the monitoring and control system, in accordance with some implementations.

FIG. 6 is a flowchart of an example method 600 to on-board an occupant (e.g., a new tenant) of the building 100 of FIG. 1 so as to be able to access and use the monitoring and control system 300, in accordance with some implementations. The method 600 can be implemented (as depicted in FIG. 6) at the tenant user device 402 and at the engine 412. The example method 600 may include one or more operations, functions, or actions illustrated by one or more blocks, such as blocks 602 to 616. The various blocks of the method 600 and/or of any other process(es) described herein may be combined into fewer blocks, divided into additional blocks, supplemented with further blocks, and/or eliminated based upon the desired implementation.

At a block 602, the engine 412 creates a tenant, specifically a tenant account in the system 300. At a block 604, the engine 414 assigns the tenant to a unit (living space) in the building 100. The tenant account, living space assignment, and other tenant-related account information may be stored by the engine 412 in the storage medium 422 in FIG. 4.

At a block 606, the engine 412 sends a message (e.g., voice, text, email, etc.) to the tenant user device 402. The message invites the tenant to join the system 300.

At a block 608, the tenant receives the message and accepts the invitation. This acceptance enables the tenant to download the application 406 from the engine 412 for installation in the tenant user device 402, at a block 610.

At a block 612, the tenant performs a sign-in process in the application, including setting up a username and password, providing profile information, etc. At a block 614, the tenant configures settings/preferences for the various space devices in the unit (e.g., in the living, office, or other human-occupied space). Example settings are shown and described, for instance, with respect to the screenshots 500 of FIGS. 5A-5C above.

At a block 616, the tenant operates the system 300 (via the application 406) to receive monitoring data, alerts, and suggestions, and to issue commands to control the space devices.

As described above, the application 406 (in conjunction with the engine 412) allows tenants in the building 100 to control and monitor various aspects of their living, office, or other human-occupied space at the block 616, such as controlling lights and blinds, adjusting thermostat settings, locking/unlocking their entry door, and getting alerts if a water leak is detected, if a door is open, or if motion occurs within the living, office, or other human-occupied space. Additionally, the tenants can view their hot and cold water usage along with their energy usage at the block 616.

Various other example features, functions, and implementations are provided next below.

Action versus energy correlation: The application 406 in the tenant user device 402 (via the engine 412) controls (directly or indirectly) a certain space device, such as the lighting 212 in FIG. 2. If the tenant is away from home and uses the application 406 to issue a command to turn on or off all of the lights in the living, office, or other human-occupied space, the tenant will not know with certainty as to whether the lights are at a particular state (e.g., turned on or off), since the tenant is away and thus unavailable for visual confirmation. Given that the engine 412 receives real-time electrical monitoring information (such as via electrical meters for the tenant's unit) and given that the engine 412 has access to lighting technical specifications that are stored in the data warehouse 424, the engine 412 can correlate a change in load (wattage) with the lighting 212 being on or off.

For example, if a light bulb turns on, the electrical load (wattage) for the living, office, or other human-occupied space goes up. Conversely, if a light bulb is turned off, then the load (wattage) for the living, office, or other human-occupied space goes down. The engine 412 knows from the stored reference data in the data warehouse 424 that each light bulb, such as a light emitting diode (LED) light bulb, draws 5 W (watts) as a reference electrical load, and knows that there are 10 LED light bulbs as a reference number of light bulbs in the living, office, or other human-occupied space. Thus, the engine 412 would expect a total increase in electrical load of 50 W (5 W×10) for the living, office, or other human-occupied space when the tenant remotely issues a command to turn on the lights. If there is a match between the electrical load as sensed by sensors and the reference electrical load (thereby representing that the number of light bulbs that have actually turned on matches a reference number of light bulbs), then the engine 412 and/or other component may validate that the 10 light bulbs did in fact turn on. However, if the engine 412 receives sensor data indicating that the energy meter has sensed only a change of 45 W, then the engine 412 can infer that an LED light bulb is "burned out" and that the other 9 light bulbs have turned on, and the burned out light bulb needs maintenance (e.g., locating and replacing). The engine 412 can then send an alert to the application 406 to inform the tenant to investigate a possible burned out bulb when the tenant comes back home, and/or can send an alert to maintenance staff of the building 100 to investigate a burned out bulb in the tenant's living, office, or other human-occupied space.

Some implementations of the system 300 may include an automatic retry function. For instance, the engine 412 receives a command from the application 406 of the tenant to turn on/off a light or to raise/lower their blinds in the living, office, or other human-occupied space. The engine 412, within a short amount of time, such as milliseconds (ms), attempts to execute that command by instructing a control unit of the blinds, lights, etc. to perform the requested action. The engine 412 checks the real-time electrical load of the space device (e.g., blinds, lights, etc.) as sensed by an energy meter for the living, office, or other human-occupied space and compares that sensed electrical load with a reference electrical load profile for the space device, which is available via a lookup table or database of device energy specifications in the data warehouse 424, so as to determine whether there has been a correct/expected change in electrical load. If the electrical load change occurs as expected, then the turn on/off action or the raise/lower action was successful. If no electrical load change occurs or if the wrong (mismatched) electrical load change has occurred, then the engine 412 retries the same comment several times (such as three times) before determining that there is potential maintenance issue that needs further investigation and remediation.

According to some implementations, if the electrical load is less than expected, then the engine 412 determine how much less, divides that electrical load number by the number of lights/blinds, and determines how many lights or blinds are out (nonfunctioning). The engine 412 then proactively and automatically sends an alert to a facility management dashboard of the application 408 of the building manager user device 404, highlighting which tenant unit has an issue and what that issue might be (e.g., X amount of lights are burned out, the blinds are non-functional, etc.).

According to some implementations, the above methodologies may be used to provide the building manager with the ability to perform a remote diagnostic check on lights and blinds in vacant units. For instance, vacant units should not have any lights turned on and/or the lights should remain functional (e.g., able to be turned on or off) and ready for prospective new tenants that tour the building 100. Thus, the building manager can use the above methodologies to confirm whether lights are off, whether lights turn on or off, whether there is a broken bulb, etc., by comparing real-time sensed electrical load data with reference electrical load data stored in the data warehouse 424.

According to some implementations, machine learning techniques are used by the engine 412 to monitor and control the space devices, such as heating, ventilation, and air conditioning (HVAC) devices. For example, the radiant heating system 132, the radiant cooling system 130, the natural ventilation 136 via the windows 134, etc. may all be operated more efficiently using machine learning techniques.

For instance, the engine 412 logs HVAC commands issued by the application 406 of the tenant, and more specifically, logs the frequency and set points of the tenant requested temperatures. If the engine 412 determines an abnormally high frequency of inputs from X amount of users (e.g., exceeds a threshold), then engine 412 determines that the radiant cooling system 130 or the radiant heat system 132 is malfunctioning and so is not sufficiently providing the desired temperature. The engine 412 therefore sends an alert to notify the building manager (via the facility management dashboard on a user interface of the application 408) to make an adjustment to the radiant cooling system 130 or the radiant heat system 132. The data sets for the machine learning techniques can be collected over time, so as to enable the engine 412 to better determine what is abnormally high frequency of inputs, the number of users, the temperature ranges, etc.

Other example implementations of machine learning techniques are possible. For instance, a tenant may have a south-facing living room. The ambient temperature inside the living room may change by several degrees over time, dependent on factors such as the time of day, the month, the ambient outside temperature, other weather conditions, the location of the sun/sunlight relative to the living room at a given time of the day, the number of people inside of the living room, the temperature settings for the radiant heating/cooling for the living room, the height of the blinds, whether a window is open to allow natural ventilation, whether the tenant husband prefers a certain temperature range in the living room which may be different from a temperature range preferred by the tenant wife, etc. Machine learning techniques can be used to collect data regarding all of these factors over time, and then use this collected data to predict/control the temperature in the living room given some expected occurrences of events (e.g., the weather forecast is for ambient outside temperatures of 70 degrees from 9:00 am to 12:00 μm, and 80 degrees from 1:00 μm to 5:00 μm, and the tenant wife is home and the tenant husband is away). The engine 412 can thus adjust the settings of the radiant cooling for the living room during these time periods, so that the temperature in the living room is automatically adjusted a desired range of the tenant wife.

As still another example implementation, if a tenant is not home and the sliding balcony door is open (e.g., a first operating condition), but the AC is set to cool the living space (e.g., a second operating condition), the engine 412 sends an alert to the application 406 on the tenant user device 402 to inform the tenant that the door is open. The application 406 prompts the tenant to turn off the AC until the door is closed, in order to save energy.

In yet another example implementation, if the tenant's space is vacant and the tenant sends a remote request to cool the space with AC, the engine 412 will know if the blinds are up or down. If up, the engine 412 sends an alert to the application 406 to notify the tenant that the blinds are up and that the tenant should (remotely) lower the blinds and wait an hour prior to initializing the AC. Ultimately, this and other examples, once executed, will save energy while not compromising comfort.

As still another example, if the unit is vacant and the lights are left on, the engine 412 alerts the tenant via the application 406 and asks if the tenant would like to turn off the lights, again as an effort to reduce/minimize energy use. As still another example, with the use of the installed energy meters for each unit, the application 406 is able to show (to the tenant) the tenant's energy usage versus the tenant's neighbors' energy usage. The application 406 then tries to "urge" each tenant to use energy more smartly and thus join a "lowest energy user of the month club" club for prizes.

Figure 7:
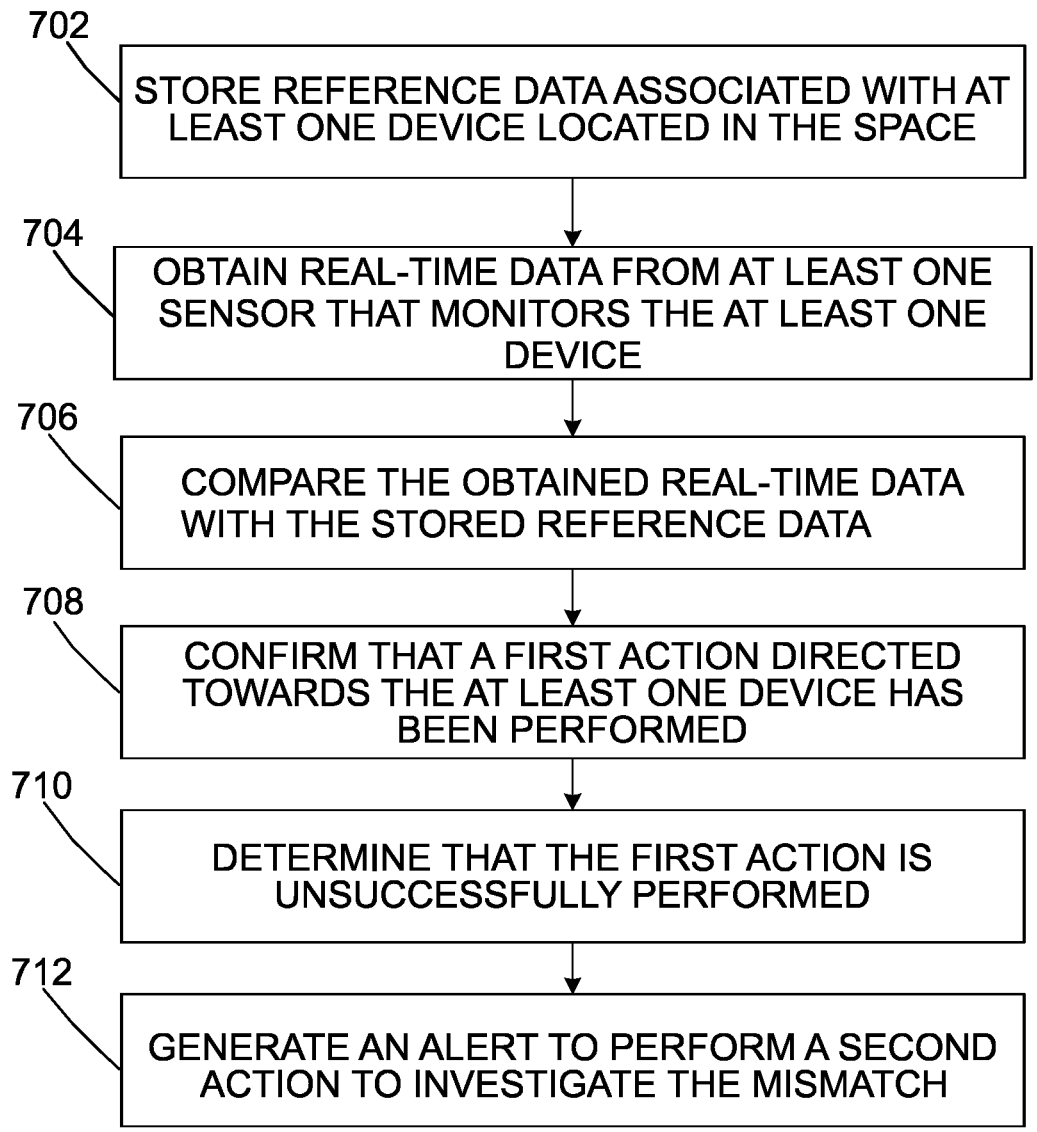
FIG. 7 is a flowchart of an example method to monitor and control operational aspects of a space for the building of FIG. 1, in accordance with some implementations.

FIG. 7 is a flowchart of an example method 700 to monitor and control operational aspects of a space, such as a living, office, or other human-occupied space, for the building 100 of FIG. 1, in accordance with some implementations. The method 700 may be performed by the engine 412, in cooperation with the data warehouse 424, the applications 406/408, the space devices, etc.

At a block 702, the engine 412 stores (in the data warehouse 424) data associated with at least one device located in the living, office, or other human-occupied space. For instance and as described above, the stored data can be technical specification data for the space devices, such as wattages for light bulbs, electrical load of blinds being lowered/raised, etc.

At a block 704, the engine 412 obtains real-time data sensed by the sensors in the living, office, or other human-occupied space. For instance, the sensors sense the room temperature, whether lights are on/off, energy usage, water usage, door open/close, leaks, motion, blinds up/down, etc.

At a block 706, the engine 412 compares the obtained real-time data with the stored reference data, so as to determine if they match. At a block 708, in response to a determination that a match exists, the engine 412 confirms/validates that a first action as requested by a user (tenant) has been performed successfully. For instance the first action may be directed towards a space device, such as turning on/off the lights or raising/lowering the blinds.

At a block 710, in response to a determination that a mismatch occurs, the engine 412 determines that the first action has not been successfully performed. For example, the electrical load profile sensed from the space does not match the expected reference load profile, thereby indicating that some lights were not turned on/off or that the blinds were not lowered/raised.

At a block 712, the engine 412 generates an alert (sent to the tenant or the building manager) to perform a second action to investigate the mismatch. For example, the alert may request the tenant to check for broken light bulbs or may request the building manager to dispatch maintenance staff to the living, office, or other human-occupied space.

Figure 8:
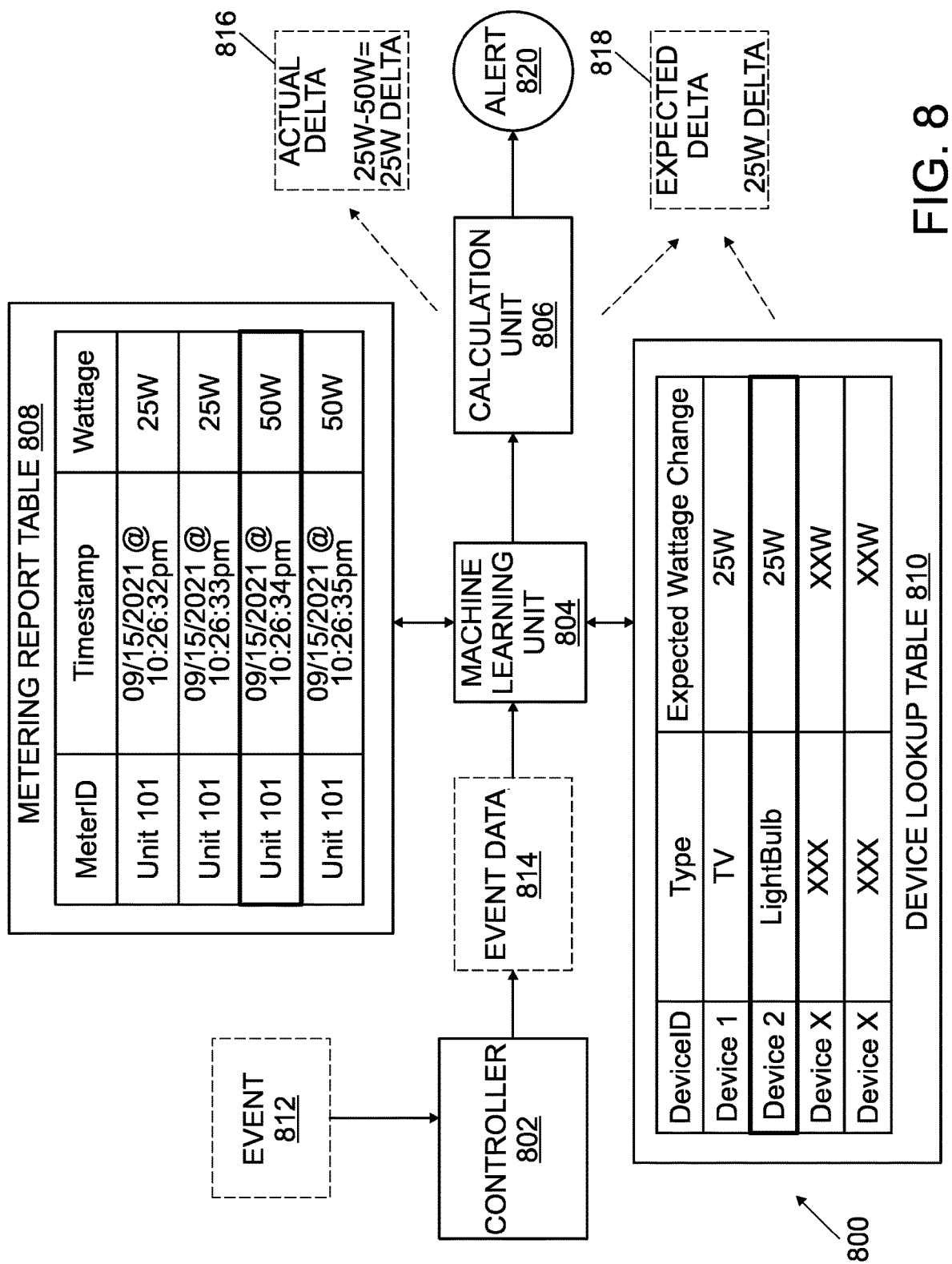
FIG. 8 is a diagram illustrating operation of an example electrical load validation system.

FIG. 8 is a diagram illustrating operation of an example electrical load validation system 800 that implements at least some of the features described above. The system 800 of one embodiment includes a controller 802, a machine learning unit 804, and a calculation unit 806. The engine 412 of FIG. 4 may be used to implement the controller 802 in some embodiments. Further, while the machine learning unit 804 and the calculation unit 806 are illustrated in FIG. 8 as discrete/separate units, their functionality may be implemented in/by the controller 802 in some embodiments. Furthermore, the calculation unit 806 may be part of the machine learning unit 804 in some embodiments.

The system 800 may include or may be coupled to one or more storage devices that store a metering report table 808 and a device lookup table 810. Such tables 808 and 810 may be stored and maintained, for example, at the data warehouse 424 of FIG. 4 or at any other suitable location (including at mobile devices) where the data in the tables 808 and 810 can be populated, looked up, revised, deleted, or otherwise accessed.

The device lookup table 810 may be populated with reference data regarding various devices in a living space. For example, the lookup table 810 is shown in FIG. 8 as having fields for device identifier (ID), device type, and expected wattage change. Thus, for a particular space, a television (device type) identified as Device 1 (device ID) may have an expected wattage change of 25 W when the television is turned off/on. A lightbulb (device type) identified as Device 2 (device ID) may have an expected wattage change of 25 W when the lightbulb is turned off/on.

The reference data in the lookup table 810 may be populated in various ways. The wattage information may be taken from manufacturer specifications of the respective device. A calibration/determination technique may also be performed, wherein the device is first installed in a unit/space, and then toggled off/on several times, with power/load meter readings being recorded each time in order to obtain a baseline power requirement for the device. Toggling off/on multiple times enables the system 800 to more accurately capture the baseline power requirement over time for the same events performed repeatedly, thereby enabling missed events or outlier data (if any) to be disregarded. Such a baseline power requirement may be obtained by averaging the meter readings (e.g., by using the calculation unit 806 or other component of the system 800), and the average value is then populated into the lookup table 810.

While the expected wattage changes in the lookup table 810 of FIG. 8 are depicted as discrete wattage values, some of the expected values may be expressed in terms of a range of values, such as "20 W to 30 W" instead of "25 W." Moreover, according to various embodiments, the expected values in the lookup table 810 may be updated over time. For example, the use of a particular device over time may indicate that its wattage use is actually 24.5 W instead of 25 W. Hence, the lookup table 810 may be updated to show 24.5 W as the expected value for that device. Any averaging that is performed to obtain an initial value or an updated value (for the expected wattage of a device) may discard outlier values (e.g., power use spikes and dips) if appropriate.

Since meters and other sensors may be used to obtain real-time electrical load of each device, updates for the lookup table 810 may be performed at any appropriate frequency. For example, expected values may be updated in the lookup table 810 several times per second, minute, hour, day, week, month, etc. Moreover, while the reference data in the lookup table 810 is in the form of wattage, other electrical and/or other physical parameters may be stored in the lookup table 810 as reference expected values, such as voltage, current, temperature, weight, speed, etc.

With respect to the metering report table 808, the metering report table 808 captures the data that is provided in real-time by the various sensors/meters in the living space. According to the example of FIG. 8, the metering report table 808 may have a meter ID field, a timestamp field, and a wattage field. The meter ID field shows the ID of a particular meter/sensor (e.g., a meter identified as "Unit 101") that has measured and reported data; the timestamp field shows the date and time (hour, minute, second) in which a particular meter reading was performed/reported by the meter Unit 101; and the wattage field shows the electrical load value (e.g., 25 W, 50 W, etc.) that was read by meter Unit 101 at each timestamp. The meter (corresponding to the meter with ID "Unit 101") may be a discrete meter that monitors electrical load of a single device or a group of devices. The meter may also be a type of meter that monitors the total electrical usage of the space as a whole.

An example operation of the system 800 will be provided next herein in the context of validating the turning on/off of a light bulb (identified as Device 2 in the lookup table 810) in a space, with the electrical load of the light bulb being monitored/read by a particular meter (e.g., meter Unit 101 in the metering report table 808). This is just one example of the use of the system 800—the system 800 may be used for validating the operation of other devices in a living space, such as window blinds, heat, air conditioning, television and other electronic appliances, etc.

First, an event 812 occurs to operate the light. For instance, the event may be the user attempting to turn on the light bulb, via the user's communication device 402 while the user is away from home. Thus, the user may not know with exact certainty at this point whether the light bulb actually turned on or did not turn on. The event 812 may also take the form of a user turning on/off a wall switch or a device switch, operating a remote control while present in the space, operating some other device to control the light bulbs, etc.

The controller 802 in turn captures/receives the event (such as by receiving a signal from the user's communication device 402 that instructs the light bulb to turn on) and obtains or otherwise determines (from the signal) a timestamp, the device type and/or device ID of the light bulb, and the type of action (e.g., turn on) being requested by the user. The controller 802 then provides this information, as well as the meter ID, as event data 814 to the machine learning unit 804.

Based on the timestamp of the event 812, the machine learning unit 804 may identify the event 812 in the metering reporting table 808 (e.g., the event that occurred at Sep. 15, 2021 at 10:26:34 PM), and may check for and collect the wattage used at the space in the most relevant timeframe before and after the event 812 (e.g., the wattage of 25 W at Sep. 15, 2021 at 10:26:33 PM before the event 812 and the wattage of 50 W at Sep. 15, 2021 at 10:26:35 PM after the event 812. Checking for the wattage after the event is performed, for example, to ensure that a steady-state condition exists, such as the light has stayed turned on or off and is not flickering.

The machine learning unit 804 singly or in cooperation with the calculation unit 806 may then calculate the actual delta at 816 (e.g., the difference of 25 W between 25 W electrical load at the space before the event 812 and 50 W electrical load at the space after the event 812).

This actual delta of 25 W is then compared by the machine learning unit 804 singly or in cooperation with the calculation unit 806 against the 25 W for an expected delta 818 (e.g., a change in a reference electrical load). If there is a match, then the match validates that the light bulb has indeed turned on. If the deltas do not match, and more specifically if the actual delta=0 W or is some other value substantially less (or in some instances, more) than the expected delta increase of 25 W, then this condition may indicate a malfunction with the light bulb, such as the light bulb being burned out and so did not turn on, the light bulb is flickering, the light bulb has an abnormal low lumen output, there is a wiring problem in the circuitry that connects to the light bulb, etc., such that the light bulb did not exhibit an expected level of electrical load.

The controller may generate an alert 820 after the comparison of the actual and expected deltas. The alert 820 may be a notification to the user, for example, that the light bulb has successfully turned on or that the light bulb did not turn on. In some embodiments, the user may receive the alert only if there is an abnormal condition (e.g., the light bulb did not turn on as requested) and is not alerted otherwise if the user's action to turn on the light bulb was successfully completed as indicated by delta 816 and delta 818 being matched. The facilities manager or other maintenance staff may also receive the alert 820 if there is an abnormal condition, thereby providing notification that an issue may exist with the light bulb that possibly requires repair, replacement, diagnosis, or other remedial action.

The example described above and in FIG. 8 is in the context of turning a light bulb on. Analogous operations may be performed in the context of turning a light bulb off, such as meter readings showing an actual decrease in electrical load at certain timestamps, which matches an expected delta decrease in electrical load when a light bulb is turned off.

In some embodiments, user input settings in combination with current/actual conditions in the space may indicate that the rate of change in the condition(s) does not match the user's expectations. For example with temperature, the heating/cooling rate for the temperature in may not match the user's expectations for the space, despite the user's repeated adjustments of a thermostat in the space. Accordingly, various embodiments herein determine whether the user's settings (including frequency of adjustments thereof) are commensurate with expected rates of change, or are indicative of an anomaly that requires remedial action by maintenance staff. This is generally referred to herein as set-versus-anomaly detection.

In the context of temperature, FIG. 9 is a diagram illustrating operation of an example temperature set-versus-anomaly detection system 900. The system 900 may be used in a building such as the building 100 of FIG. 1, wherein centralized heating and cooling is provided to the spaces in the building 100. For example, the hot water system 126 can provide radiant heating to the spaces via pipes in the flooring that carry hot water. The cold water system 122 can provide cooling to the spaces, via fan coils in the spaces and pipes that carry cold water supplied by a municipal utility or other source. The hot water system 126 and cold water system 122 for the entire building 100 may be controlled at a central utility room, which may be located at a basement or ground floor of the building 100. An air source heat pump at the utility room may be used for heating/cooling of the water.

With the centralized hot water system 126 and cold water system 122, there are practical/physical limits as to the rates of heating and cooling in each of the spaces in the building 100. For example, there are limits on the maximum and minimum temperatures that can be controlled in each space, as well as limits on the amount of time it takes to change from a first temperature to a second temperature in a particular space.

Various factors influence the rates of change in temperatures and temperature limits in such a building 100 having the centralized hot water system 126 and cold water system 122. For instance, the cold water provided by a municipal water utility for the cold water system 122 may be nominally at about 50 degrees F. The rates of change of temperature may also vary from one space to another. As an example, a space having a studio-type configuration may be easier to quickly heat/cool as compared to a multi-room space. As another example, south-facing spaces (which, the northern hemisphere, receive more sunlight) may cool down more slowly but heat up more quickly, as compared to north-facing spaces. As still another example, the rates of change may be faster/slower for certain bands (ranges) of temperatures as compared to other bands (ranges) of temperature.

With the foregoing in mind, a situation may occur wherein a user/occupant may be dissatisfied with the quality of the HVAC output in the user's space. The system 900 monitors and records temperature input values that the user may set, such as via a thermostat. If the user is repeatedly pressing a heat up or cool down button of the thermostat, it may be inferred that the user is unhappy with the quality of HVAC, output. In a "I want more heat" situation, the user is still cold despite having already pressed the heat up button on the thermostat (to set the temperature to a higher temperature), and so yet again presses the heat up button (to set the temperature to an even higher temperature). Perhaps the user may do these temperature set point changes over and over again within a short time span (e.g., two hours), believing that if the heat up button is pressed repeatedly, this will cause more heat or a higher rate of heat output for the space. This belief by the user is in fact not correct, since the heating system (e.g., the hot water system 126) produces a set amount of heat, and simply pressing the heat up button repeatedly does not cause the water to become hotter.

For a "I want it cooler" situation, an inverse of the foregoing occurs, wherein the user presses the cool down button of the thermostat so as to reduce the temperature in the space, expects the space to get cooler but the temperature does not drop to a level desired/expected by the user, and so the user presses the cool down button again/repeatedly over time. However, since the cooling system 126 is water based, simply pressing the cool down button repeatedly does not cause the water to become colder.

According to various embodiments, the system 900 of FIG. 9 records and monitors such user set point adjustment actions versus the actual temperatures in the space. After recording this data for a plurality of spaces (e.g., different tenants/users), if a certain number of users are experiencing this heating/cooling issue, the system 900 may send an alert to the maintenance staff and recommend a heating or air conditioning temperature set point adjustment in/at the central plant. Such adjustment may involve pre-cooling (or further cooling) or increasing the heating of the water, so as to provide the rates of change and temperatures that the users are expecting from their temperature set point inputs on their thermostats. FIG. 9 illustrates such a situation/process in more detail, in the context of adjusting a temperature for cooling a space.

The system 900 of FIG. 9 includes a controller 902. The controller 902 may the same as the controller 802 of FIG. 8 and/or the engine 412 of FIG. 4, or a separate/different component. The system 900 may include or may be coupled to a storage device that stores a temperature set event report table 904. Such storage device may be the implemented by the data warehouse 424 of FIG. 4, by the same storage device(s) that store the tables 808 and 810 of FIG. 8, or by some other storage device or storage location.

The example table 904 of various embodiments includes multiple fields: a unit ID field that identifies the space of the user (e.g., a unit ID of "Unit 101"), a timestamp field that provides the date and time that a user temperature set point adjustment occurred or a temperature check occurred, a set field that provides the temperature (temperature set point) that was set by the user, an actual field that provides the actual temperature of the space, a type field that identifies the type of action that occurred at the timestamp, a rate field that provides the actual rate of change of the temperature in the space, and an expected rate field that provides the expected rate of change of the temperature in the space as a reference. The data in the table 904 can thus be provided on a per space basis over time.

According to various embodiments, the values of the expected rate of change in the temperature (in the expected rate field) may be based on historical data collected over time and that may have a number of variations from one situation to another, and may also be updated over time for more precision and/or to account for changing conditions. For instance, the expected rate may be different for a south-facing space versus a north-facing space; may be different for a space at a lower story versus a space at a higher story (e.g., due to heat rising, more sun exposure, etc. at upper stories of the building 100); may be different for studio configurations versus other configurations; may vary between bands of temperature (e.g., the rate of change for cooling from 90 degrees F. to 85 degrees may be different than cooling from 85 degrees F. to 80 degrees F.); may be different for spaces with relatively more window panes than spaces with relatively less window panes (e.g., window exposure); may be different for spaces with thicker/more insulation than other spaces; may be different dependent on the season, weather, or other environmental conditions (e.g., winter season versus summer season, sunny weather versus rainy weather, night versus day, and so forth), may be different depending on whether window blinds are up/down at particular units and their windows, etc. and combinations thereof. The controller 902 and/or the machine learning unit 906 may perform the determination, populating, and updating of the values in the expected rate field.

Values in the table 904 may be populated, revised, deleted, read, or otherwise accessed by the controller 902 and the machine learning unit 906. The machine learning unit 906 of some embodiments may be a sub-component of the controller 902 or a separate component.

In operation, an event 908 occurs wherein the user (as an example) sets a thermostat to 75 degrees F., with the current temperature in the space being 80 degrees F., on Sep. 15, 2021 at 8:00 AM. The controller 902 receives this event 908 as a signal, and records the temperature set by the user (e.g., a first temperature set point), the timestamp, and the current temperature in the table 904 for Unit 101, and identifies the event/occurrence at the timestamp as being a user set (user input) of the temperature. This data is shown in FIG. 9 as being populated into the table 904 at 910. With the user having performed this temperature set point adjustment/input, the space begins to cool (e.g., the piping system changes the actual temperature in the space towards 75 degrees F.) and is expected to cool at a rate of 0.2 degrees F. per minute, as also shown at 910 in the table 904.

At 912, the controller 902 checks the temperature in the space by taking three temperature readings at certain time intervals, and records these actual temperatures in the table 904: 8:02 AM (80 degrees F.), 8:05 AM (79 degrees F.), and 8:10 AM (78 degrees F.). The controller 902 records the actual rate of change at these respective timestamps as 0.21 degrees F. per minute, 0.15 degrees F. per minute, and 0.16 degrees F. per minute. The controller further determines at 912 whether the actual rate of change in temperature is meeting or is otherwise commensurate with the expected rate of change, which is the case in the example of FIG. 8.

At 914, the controller records another event in the table 904 wherein the user again presses the cool down button on the thermostat at 8:15 AM (e.g., the user presses the cool down button again while the space is cooling commensurately with the expected rate of change as determined at 912), so as to lower the temperature set point from 75 degrees F. to 73 degrees F. (e.g., a second temperature set point), likely as an attempt to more quickly achieve the temperature set point of 75 degrees F. because the user does not feel that the space is cooling down at a sufficient/satisfactory speed due to the actual temperature being at 77 degrees F. The controller 902 then makes a temperature check at 8:20 AM, and records the actual temperature (76 degrees F.) and actual rate of change (0.13 degrees F. per minute), at 916 in the table 904.

The user then makes another temperature set point adjustment at 8:25 AM at 918, so as to reduce the temperature set point from 73 degrees F. to 70 degrees F., again while the space is cooling at the expected rate and likely due to the user being dissatisfied with the cooling rate. The controller 902 then checks the actual temperature at 8:30 AM (75 degrees F.) and 8:35 AM (75 degrees F.), and records this information and the actual rate of change (0.21 degrees F. per minute), at 920 in the table 904.

The space may continue to cool until the temperature set point desired by the user is reached (e.g., 75 degrees F.), with the controller 902 continuing to perform and record temperature checks into the table 904. The user may or may not make additional adjustments to the temperature set point before that temperature set point is reached. It is also possible that the temperature set point (e.g., 75 degrees F. or other temperature set point in this example) is not actually ever reached, for example if the user has set a temperature that is beyond the working range of the central plant and/or due to out-of-the-ordinary weather conditions (an excessive heat wave or sub-freezing temperatures) that unduly tax the capabilities of the central plant.

At 922, the controller 902 may perform an analysis to determine if an anomaly exists. For instance, if the time to reach the temperature set point (e.g., the time to cool the space in this scenario to 75 degrees F. as set at 910) is above or below an average expected/reference cooling time, then the controller 902 may send a first alert 924 to the maintenance staff. For example, if the time to reach the set temperature was above the average expected cooling time (e.g., it took too long to cool the space to the temperature set point), then the first alert 924 would notify the maintenance staff to possibly consider and implement a pre-chilling of the water in the cold water system 122, so as to increase the expected rate of cooling.

As another example, if the time to reach the set temperature was below the average expected cooling time (e.g., the space cooled more quickly than expected in reaching the temperature set point), then this outlier/anomaly would trigger the first alert 924 to notify the maintenance staff to possibly consider and implement deactivating a pre-chilling (if currently activated) of the water in the cold water system 122 (since the water may be too cold) and/or the machine learning unit 906 may make updates to the value(s) of the expected rates of change in the table 904.

Furthermore according to various embodiments, the machine learning unit 906 records each of the user input events (temperature set point adjustments) and runs a "user acceptance" algorithm on the data in the table 904 to determine if the central plant or components thereof is cooling (or heating) at the expected rate. If the logic of the algorithm determines that the user is dissatisfied (e.g., the user has not accepted the current temperature condition in the space, based on the number of temperature set point inputs provided by the user within a particular timeframe), then the machine learning unit 906 and/or the controller 902 may send a second alert 926 to the maintenance staff. The alert 926 would notify the maintenance staff to consider and implement a temperature set point adjustment in the central plant, such as controlling the air source heat pump or other device to perform a pre-chilling or some further chilling (e.g., cool down the water by another 5 degrees F.) or a further heating of the water (e.g., heat the water another 5 degrees F.) prior to being circulated to the spaces. The first and second alerts may be merged together into a single alert, for instance if both conditions pertaining to the average expected heating/cooling time and the number of user inputs for temperature set points during a timeframe being excessive are met.

With respect to evaluating threshold(s) for anomalies in user temperature set point inputs, the timeframe in which the user inputs occur and the number of user inputs in the timeframe may vary from one implementation to another. For example, a situation may be deemed to be an anomaly if five or more user temperature set point adjustments are made within the span of one hour, by an individual user. According to various embodiments, adjustments in the temperature set point of the central plant is performed when a plurality of users that have made a number of temperature set adjustments exceeds a threshold number of users, and/or the time to reach the final set temperature in the spaces of these users exceed the expected average time. Considering the number of users, versus just an individual user, provides a better indication that the cooling/heating performance is not meeting the expectations of a substantial subset of the building population, and therefore, adjustments in the central plant (which affects everyone in the building) may be appropriate.

Various types of data may be tracked for these users by the controller 902 and/or the machine learning unit 906, so as to determine whether a common problem is being encountered by multiple users. Data that may be tracked and examined may include whether the spaces are at upper or lower stories, whether the spaces are south-facing or north-facing, whether blinds are up/down in the spaces, etc., in addition to the number of temperature set point adjustments made by the users during a timeframe and whether the temperature set point was reached within an average expected time.

Adjustments in temperature set point of the central plant for cooling may not be implemented, for example, if an anomaly is found to exist for only a single (or relatively fewer number of users) who have south-facing spaces but such users have all of their blinds fully opened during sunny weather and have made multiple temperature set point adjustments, while most other users (e.g., a relatively higher number of users that exceeds a threshold number of users) at other south-facing spaces have fully/mostly closed blinds and have not made multiple temperature set point adjustments within a timeframe while their respective spaces are cooling—making temperature set point adjustments to the central plant (which affects all spaces in the building 100) under these circumstances (to address the anomalies attributable to just a minority of the users) may not be practical and so need not be performed in some situations.

According to various embodiments, one or more of the following non-limiting scenarios are possible in the system 900:

The space was heated/cooled (e.g., achieved the set temperature) at about the average expected time, and multiple user temperature set adjustments were not sufficient in number to reach a threshold for an anomaly. In this situation, no adjustment to the central plant may be needed.

The space was heated/cooled (e.g., achieved the set temperature) at above the average expected time (e.g., the space took longer than expected to cool down or heat up), and multiple user temperature set adjustments were not sufficient in number to reach a threshold for an anomaly. In this situation, no adjustment to the central plant may be needed since the users may have been satisfied with the actual rate of change, albeit being slower than the expected rate of change. The values in expected rate field in the table 904 may be considered for updating to reflect the slower rate of change.

The space was heated/cooled (e.g., achieved the set temperature) at above the average expected time (e.g., the space took longer than expected to cool down or heat up), and multiple user temperature set adjustments were sufficient in number to exceed a threshold for an anomaly. In this situation, an adjustment to the central plant may be needed since the users may have been dissatisfied with the actual rate of change. The values in expected rate field in the table 904 may be considered for updating to reflect the slower rate of change.

The space was heated/cooled (e.g., achieved the set temperature) at below the average expected time (e.g., the space cooled down or heated up faster than expected), and multiple user temperature set adjustments were not sufficient in number to reach a threshold for an anomaly. The values in expected rate field in the table 904 may be considered for updating to reflect the faster rate of change. Adjustments to the central plant may be considered, for example for energy efficiency purposes by deactivating any pre-chilling for cold water or lowering the set point for hot water used for heating (e.g., changing the set point for hot water from 145 degrees F. to a lower and more energy-efficient temperature of 115 degrees F., until such time that user temperature sets increase in frequency during heating cycles to indicate that the users are dissatisfied with the amount of time being taken to heat their spaces, in which case the temperature of the water will be raised above 115 degrees F.).

The space was heated/cooled (e.g., achieved the set temperature) at below the average expected time (e.g., the space cooled down or heated up faster than expected), and multiple user temperature set adjustments were sufficient in number to reach a threshold for an anomaly. The values in expected rate field in the table 904 may be considered for updating to reflect the faster rate of change. Adjustments to the central plant may be considered, for example since the number of temperature set point adjustments by the users seem to indicate that they are dissatisfied with the current rate of change, even though the space heated up or cooled down faster than expected.

The foregoing examples are just some of the possible permutations that may be addressed by the system 900. A main point is that the time to reach the temperature set by a user, in combination with a number of user temperature set adjustments, are used to determine if an anomaly exists that requires determination of whether a change is needed in the central plant settings/configuration.

The present disclosure is not to be limited in terms of the particular embodiments described in this application, which are intended as illustrations of various aspects. Many modifications and embodiments can be made without departing from its spirit and scope. Functionally equivalent methods and apparatuses within the scope of the disclosure, in addition to those enumerated herein, are possible from the foregoing descriptions. Such modifications and embodiments are intended to fall within the scope of the appended claims. The present disclosure is to be limited only by the terms of the appended claims, along with the full scope of equivalents to which such claims are entitled. This disclosure is not limited to particular methods, which can, of course, vary. The terminology used herein is for the purpose of describing particular embodiments only, and is not intended to be limiting.

With respect to the use of substantially any plural and/or singular terms herein, the terms can be translated from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

If a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). Virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, the disclosure is also thereby described in terms of any individual member or subgroup of members of the Markush group.

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. All language such as "up to," "at least," "greater than," "less than," and the like include the number recited and refer to ranges which can be subsequently broken down into subranges as discussed above. Finally, a range includes each individual member. Thus, for example, a group having 1-3 items refers to groups having 1, 2, or 3 items. Similarly, a group having 1-5 items refers to groups having 1, 2, 3, 4, or 5 items, and so forth.

The herein described subject matter sometimes illustrates different components contained within, or connected with, different other components. Such depicted architectures are merely embodiments, and in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific embodiments of operably couplable include but are not limited to physically mateable and/or physically interacting components.

While various aspects and embodiments have been disclosed herein, other aspects and embodiments are possible. The various aspects and embodiments disclosed herein are for purposes of illustration and are not intended to be limiting.

What is claimed is:

1. A method to monitor and control operational aspects associated with a smart space in a building, the method comprising:
   storing reference data associated with at least one device located in the space;
   obtaining real-time data from at least one sensor that monitors the at least one device;
   comparing the obtained real-time data with the stored reference data to determine whether the real-time data matches the stored reference data;
   in response to a determination that the obtained real-time data matches the stored reference data, validating that a first action directed towards remotely controlling the at least one device has been performed as requested by a user of the space via a user device, wherein human occupants are absent in the space, at a time that the first action is requested, and so unable to observe behavior of the at least one device in response to the first action; and
   in response to a determination that there is a mismatch between the obtained real-time data and the stored reference data, determining that the first action is unsuccessfully performed and generating an alert to perform a second action to investigate the mismatch.

2. The method of claim 1, wherein the at least one sensor includes a leak sensor, a door sensor, a motion sensor, a temperature sensor, an electrical load sensor, a sensor for window blinds, or a water usage sensor.

3. The method of claim 1, wherein:
   the at least one device includes one or more light bulbs,
   comparing the obtained real-time data with the stored reference data includes comparing electrical load of the light bulbs as sensed by the at least one sensor with reference electrical load of the light bulbs that is stored as the reference data,
   validating that the first action directed towards the at least one device has been performed as requested by the user includes confirming that a number of the light bulbs that are actually in a particular state matches a reference number of the light bulbs in the particular state, based on a change in the electrical load as sensed matching a change in the reference electrical load, and
   determining that the first action is unsuccessfully performed includes determining that the number of the light bulbs that are actually in the particular state is mismatched with the reference number of the light bulbs in the particular state, based on the change in electrical load as sensed being mismatched with the change in the reference electrical load.

4. The method of claim 1, wherein:
   the at least one device includes one or more window blinds,
   comparing the obtained real-time data with the stored reference data includes comparing electrical load to move the window blinds to a particular level as sensed by at least one sensor with reference electrical load that is stored as the reference data,
   validating that the first action directed towards the at least one device has been performed as requested by the user includes confirming that the blinds have been moved to the particular level, based on a change in the electrical load as sensed being same as a change in the reference electrical load, and
   determining that the first action is unsuccessfully performed includes determining that the blinds have failed to have been moved to the particular level, based on the change in the electrical load as sensed being different from the change in the reference electrical load.

5. The method of claim 1, wherein generating the alert to perform the second action includes sending a message to a communication device of a building manager to investigate the mismatch.

6. The method of claim 1, further comprising sending, based on the obtained real-time data, a suggestion to a communication device of the user to change a usage pattern of the at least one device.

7. The method of claim 1, wherein:
   the at least one device includes a first device and a second device,
   the at least one sensor senses that the first device is at a first operating condition and that the second device is at a second operating condition, and
   the method further comprises prompting the user to change the first operating condition or the second operating condition so as to reduce energy usage in the space.

8. The method of claim 1, further comprising updating the reference data over time to represent operation of the at least one device.

9. The method of claim 1, further comprising performing an on-boarding process for the user.

10. The method of claim 1, further comprising providing the obtained real-time data to a communication device of a building manager to enable diagnostics of at least one device.

11. The method of claim 1, further comprising performing one or more automatic retries of the first action, prior to determining that the first action is unsuccessful.

12. The method of claim 1, wherein the space in the building includes at least one of: a smart living, office, or other human-occupy-able space or a smart storage space in the building, and wherein the space is defined by pre-manufactured ceiling, floor, and wall panels that are attached to a structural frame of the building.

13. A non-transitory computer-readable medium having computer-readable instructions stored thereon, which in response to execution by at least one processor, cause the processor to perform or control performance of operations that comprise:
   storing reference data associated with at least one device located in a space of a building;
   receiving, from a user device of a user of the space, a request to perform a first action directed towards remotely controlling the at least one device;
   obtaining real-time data from at least one sensor that monitors the at least one device;
   comparing the obtained real-time data with the stored reference data to determine whether the real-time data matches the stored reference data;
   in response to a determination that the obtained real-time data matches the stored reference data, validating that the first action directed towards remotely controlling the at least one device has been performed, wherein no human occupants are present in the space at a time that the first action is requested such that behavior of the at least one device in response to the first action is unobserved; and
   in response to a determination that there is a mismatch between the obtained real-time data and the stored reference data, determining that the first action is unsuccessfully performed and generating an alert to perform a second action to investigate the mismatch.

14. A monitoring and control system for a smart space in a building, the system comprising:
   a storage device operative to store reference data associated with at least one device located in the space;
   at least one sensor communicatively coupled to the storage device and operative to monitor the at least one device and to provide real-time data associated with the monitored at least one device; and
   a monitoring and control engine communicatively coupled to the storage device and to the at least one sensor, and operative to:
      obtain the real-time data from the at least one sensor;
      compare the obtained real-time data with the stored reference data to determine whether the real-time data matches the stored reference data;
      in response to a determination that the obtained real-time data matches the stored reference data, validate that a first action directed towards remotely controlling the at least one device has been performed as requested by a user of the space via a user device, wherein human occupants are absent in the space, at a time that the first action is requested, and so unable to observe behavior of the at least one device in response to the first action; and
      in response to a determination that there is a mismatch between the obtained real-time data and the stored reference data, determine that the first action is unsuccessfully performed and generate an alert to perform a second action to investigate the mismatch.

15. The system of claim 14, further comprising an application installed on or available to a communication device of the user, wherein the application is operative to provide a user interface to present the obtained real-time data, a result of the comparison, and the alert on a user interface of the communication device.

16. The system of claim 14, wherein the at least one sensor includes a leak sensor, a door sensor, a motion sensor, a temperature sensor, an electrical load sensor, a sensor for window blinds, or a water usage sensor.

17. The system of claim 14, wherein:
   the at least one device includes one or more light bulbs,
   to compare the obtained real-time data with the stored reference data, the engine is operative to compare electrical load of the light bulb as sensed by the at least one sensor with reference electrical load of the light bulbs that is stored as the reference data,
   to validate that the first action directed towards the at least one device has been performed as requested by the user, the engine is operative to confirm that a number of the light bulbs that are actually in a particular state matches a reference number of the light bulbs in the particular state, based on a change in the electrical load as sensed matching a change in the reference electrical load, and
   to determine that the first action is unsuccessfully performed, the engine is operative to determine that the number of the light bulbs that are actually in the particular state is mismatched with the reference number of the light bulbs in the particular state, based on the change in the electrical load as sensed being mismatched with the change in the reference electrical load.

18. The system of claim 14, wherein:
   the at least one device includes one or more window blinds,
   to compare the obtained real-time data with the stored reference data, the engine is operative to compare electrical load to move the window blinds to a particular level as sensed by the at least one sensor with reference electrical load that is stored as the reference data,
   to validate that the first action directed towards the at least one device has been performed as requested by the user, the engine is operative to confirm that the blinds have been moved to the particular level, based on a change in the electrical load as sensed being same as a change in the reference electrical load, and
   to determine that the first action is unsuccessfully performed, the engine is operative to determine that the blinds have failed to have been moved to the particular level, based on the change in the electrical load as sensed being different from the change in the reference electrical load.

19. The system of claim 14, wherein the engine is further operative to perform one or more automatic retries of the first action, prior to determining that the first action is unsuccessful.

20. The system of claim 14, wherein the engine implements a machine learning technique to determine a frequency of requests from users directed towards the at least one device, and to determine that the at least one device is malfunctioning if the frequency of requests exceeds a threshold.

* * * * *